United States Patent [19]

Suzuki et al.

[11] Patent Number: 5,787,308
[45] Date of Patent: Jul. 28, 1998

[54] PRINTING APPARATUS AND METHOD IN WHICH VIRTUAL BUSY SIGNAL IS GENERATED WHEN PRINTER BUFFER HAS LARGER VACANT AREA THAN A PREDETERMINED VALUE

[75] Inventors: Naohisa Suzuki, Yokohama; Koji Fukunaga, Tokyo; Masaki Nishiyama, Yokohama; Tsutomu Takahashi, Kawasaki; Jiro Tateyama, Yokohama; Jun Oida, Kawasaki; Hisatsugu Naito, Tokyo, all of Japan

[73] Assignee: Canon Kabushiki Kaisha, Tokyo, Japan

[21] Appl. No.: 357,290

[22] Filed: Dec. 13, 1994

Related U.S. Application Data

[63] Continuation of Ser. No. 919,226, Jul. 27, 1992, abandoned.

[30] Foreign Application Priority Data

Jul. 30, 1991 [JP] Japan ................... 3-190371

[51] Int. Cl.⁶ .................................................. G06F 13/00
[52] U.S. Cl. ................... 395/839; 395/877; 364/235; 364/930
[58] Field of Search ............................... 395/275, 877, 395/839; 364/200, 235, 930

[56] References Cited

U.S. PATENT DOCUMENTS

| | | | |
|---|---|---|---|
| 4,048,625 | 9/1977 | Harris, Jr. et al. | 364/900 |
| 4,285,038 | 8/1981 | Suzuki et al. | 395/877 |
| 4,381,553 | 4/1983 | Ferguson | 364/900 |
| 4,727,480 | 2/1988 | Albright et al. | 364/200 |
| 4,829,421 | 5/1989 | Ritchie | 395/275 |
| 4,878,123 | 10/1989 | Miura et al. | 358/401 |
| 4,896,289 | 1/1990 | Svinicki et al. | 364/900 |
| 4,933,840 | 6/1990 | Sevs et al. | 395/877 |
| 5,003,463 | 3/1991 | Coyle et al. | 395/877 |
| 5,119,081 | 6/1992 | Ikehira | 364/900 |
| 5,388,216 | 2/1995 | Oh | 395/275 |

OTHER PUBLICATIONS

*Microcomputer Structures*, Vvanesic et al. ©1989, 620–623.

IBM Technical Disclosure Bulletin, vol. 30, No. 12, May 1988, New York, U.S., p. 14, "Printer Surge Buffer Receiving Data at Two Rates".

IBM Technical Disclosure Bulletin, vol. 27, No. 1B, Jun. 1984, New York, U.S., p. 598, D.M. Hsieh et al., "Improved Printer Throughout".

IBM Technical Disclosure Bulletin, vol. 33, No. 8, Jan. 1991, New York, U.S., pp. 485–486, "Printer Using Direct Memory Access to Reduce Communication Bandwidth".

*Primary Examiner*—Thomas C. Lee
*Assistant Examiner*—Ki S. Kim
*Attorney, Agent, or Firm*—Fitzpatrick, Cella, Harper & Scinto

[57] ABSTRACT

In a data transfer method, virtual handshake busy data is transferred to an I/O register when data is transferred through a parallel interface between data processing and printer units connected to the I/O register through a bus and a transfer storage area in the printer unit has an empty area having a predetermined amount or more.

13 Claims, 25 Drawing Sheets

FIG. 15

| ADDRESS | DEVICE | | |
|---|---|---|---|
| 0000H-001FH | DMAC 1 (8237) | | |
| 0020H-0021H | IRQC 1 (8259A) | ADDRESSES IN RIGHT COL ARE USED IN ACTUAL ADDRESS DECODING | 0020H-003FH |
| 0040H-0043H | SYSTEM TIMER (8254) | | 0040H-005FH |
| 0060H-0064H | KB (8042) | | 0060H-006FH |
| 0070H-0071H | RTC, NMI MASK | | 0070H-007FH |
| 0080H-008FH | DMA BANK REGISTER | | 0080H-009FH |
| 00A0H-00A1H | IRQC 2 (8259A) | | 00A0H-00BFH |
| 00C0H-00DFH | DMAC 2 (8237) | | |
| 00F0H-00FFH | FPU | | |
| 01F0H-01FFH | HDC | | |
| 0200H-0207H | GAME I/O | | |
| 0278H-027FH | PARALLEL CENTRONICS (PRINTER PORT 3) | | |
| 02F8H-02FFH | RS-232C PORT 2 | | |
| 0300H-031FH | RESERVED | | |
| 0360H-036FH | RESERVED | | |
| 0370H-0377H | RESERVED | | |
| 0378H-037FH | PARALLEL CENTRONICS (PRINTER PORT 2) | | |
| 0380H-03AFH | RESERVED | | |
| 03B0H-03BBH | VIDEO CONTROLLER | | |
| 03BCH-03BFH | PARALLEL CENTRONICS (PRINTER PORT 1) | | |
| 03C0H-03DFH | VIDEO CONTROLLER | | |
| 03E0H-03EFH | RESERVED | | |
| 03F0H-03F7H | FDC | | |
| 03F8H-03FFH | RS-232C PORT 1 | | |

Rows 0000H-00FFH: SYSTEM BOARD ONLY

FIG. 16

| INTR NO. | USES | |
|---|---|---|
| 00H | SUBTRACTION ERROR | |
| 01H | SINGLE STEP | |
| 02H | NMI | |
| 03H | BREAK POINT | |
| 04H | OVERFLOW | |
| 05H | PRINT SCREEN (W-SIDES HARD COPY) | |
| 06H | RESERVED | |
| 07H | RESERVED | |
| 08H | IRQ0 TIMER INTERRUPT | (MASTER) |
| 09H | IRQ1 KB HARDWARE INTERRUPT | (MASTER) |
| 0AH | IRQ2 CASCADE CONNECTION OF IRQC 2 | (MASTER) |
| 0BH | IRQ3 SERIES PORT 2 INTERRUPT | (MASTER) |
| 0CH | IRQ4 SERIES PORT 1 INTERRUPT | (MASTER) |
| 0DH | IRQ5 PARALLEL PORT 3 INTERRUPT | (MASTER) |
| 0EH | IRQ6 DISC CONTROLLER INTERRUPT | (MASTER) |
| 0FH | IRQ7 PARALLEL PORTS 1 & 2 INTERRUPT | (MASTER) |
| 10H | VIDEO BIOS CALL | |
| 11H | SYSTEM STRUCTURE | |
| 12H | MEMORY SIZE | |
| 13H | DISC BIOS CALL | |
| 14H | RS - 232C BIOS CALL | |
| 15H | OTHER SYSTEM CALL | |
| 16H | KB BIOS CALL | |
| 17H | PRINTER BIOS CALL | |
| 18H | RESERVED | |
| 19H | BOOTSTRAP | |
| 1AH | TIMER SERVICE | |
| 1BH | KB BREAK | |
| 1CH | USER TIMER INTERRUPT | |
| 1DH | VIDEO PARAMETER | |
| 1EH | FLOPPY DISC PARAMETER | |
| 1FH | GRAPHICS CHARACTER | |

FIG. 17

| INTR NO. | USES |
|---|---|
| 20H~32H | MS - DOS FUNCTION CALL |
| 33H | MOUSE DRIVER |
| 34H~3FH | MS - DOS RESERVED |
| 40H~5FH | RESERVED FOR BIOS |
| 60H~66H | FOR USER PROGRAM INTERRUPT |
| 67H | LIM EMS DRIVER |
| 68H~6FH | RESERVED |
| 70H | IRQ8 RTC INTERRUTT (SLAVE) |
| 71H | IRQ9 INT 0AH DIRECT (SLAVE) |
| 72H | IRQ10 RESERVED (SLAVE) |
| 73H | IRQ11 RESERVED (SLAVE) |
| 74H | IRQ12 RESERVED (SLAVE) |
| 75H | IRQ13 FPU INTERRUPT (SLAVE) |
| 76H | IRQ14 HD INTERRUPT (SLAVE) |
| 77H | IRQ15 RESERVED (SLAVE) |
| 78H~F0H | RESERVED |
| F1H~FFH | RESERVED FOR AX SYSTEM |

[ NOTE ]
- INT 08H-0FH & INT 70H-77H : HARDWARE INTERRUPT
- INT 86H-F0H : RESERVED FOR BASIC EXECUTION IN PC/AT

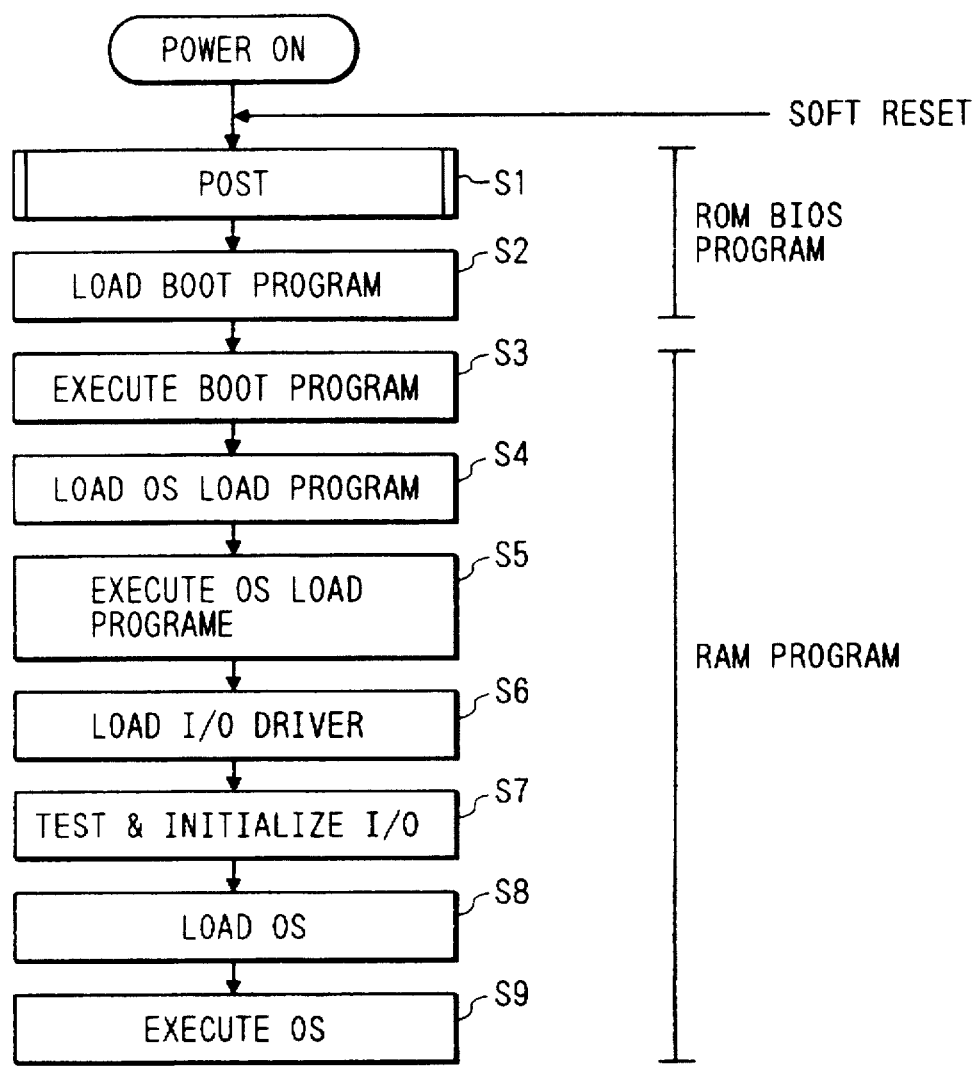

PRINTER CONTROL SECTION POWER/SAVE-MANAGEMENT FLOW (1)

PRINTING APPARATUS AND METHOD IN WHICH VIRTUAL BUSY SIGNAL IS GENERATED WHEN PRINTER BUFFER HAS LARGER VACANT AREA THAN A PREDETERMINED VALUE

This application is a continuation of application Ser. No. 07/919,226 filed Jul. 27, 1992, now abandoned.

BACKGROUND OF THE INVENTION

1. Field of the Invention

The present invention relates to a data transfer method in a parallel IF between a personal computer and a printer.

2. Related Background Art

In data transfer to a printer through an IF adapter (e.g., a Centronics printer IF) in a personal computer, data transfer handshaking is performed using BUSY and ACK signals in accordance with processing generally called BIOS between I/O register firmware of a parallel IF adapter and the OS (operating system). A printer driver under an application program may directly access I/O register firmware of the parallel IF adapter, but handshaking must always be performed once for 1-byte data transfer.

When parallel IF handshaking is performed by the BIOS or even if the printer driver directly accesses the I/O register firmware of the IF adapter, handshaking takes time. A high-speed parallel IF for a printer cannot therefore contribute to a high-speed operation.

SUMMARY OF THE INVENTION

The present invention has been made to solve the conventional problems described above, and has as its object to arrange a parallel IF means for transferring print data and a command, a printer unit including an input data temporary storage means for temporarily storing transferred data, a remaining area alarm means for detecting a small remaining data storage area of the input data temporary storage means, and a busy data exchange means for exchanging busy data serving as transfer enable/disable data of the parallel IF means, and a data processing unit including a virtual busy generating means for generating short virtual busy data when the busy data is not present, wherein no busy data is supplied to the data processing unit in the absence of a remaining area alarm by the remaining area alarm means when the input data temporary storage means is to be utilized.

It is another object of the present invention to solve the conventional problems described above and to transfer data through a parallel IF between data processing and printer units connected to an I/O register through a bus and virtual busy data for handshaking to the I/O register when the empty transfer data storage area for the printer has a predetermined amount or more.

It is still another object of the present invention to solve the conventional problems described above and to inhibit to transfer handshake busy data to an I/O register when data transfer is performed by handshaking using general-purpose BIOS control through a parallel IF between data processing and printer units connected to the I/O register through a bus and the empty transfer data storage area for the printer unit has a predetermined amount or more.

BRIEF DESCRIPTION OF THE DRAWINGS

FIG. 15 is an I/O space address map of the host;

FIG. 16 is a view showing the contents of an interruption vector;

FIG. 17 is a view showing the contents of an interruption vector;

FIG. 18 is a flow chart of a power-ON operation;

DETAILED DESCRIPTION OF THE PREFERRED EMBODIMENT

Figure 1:
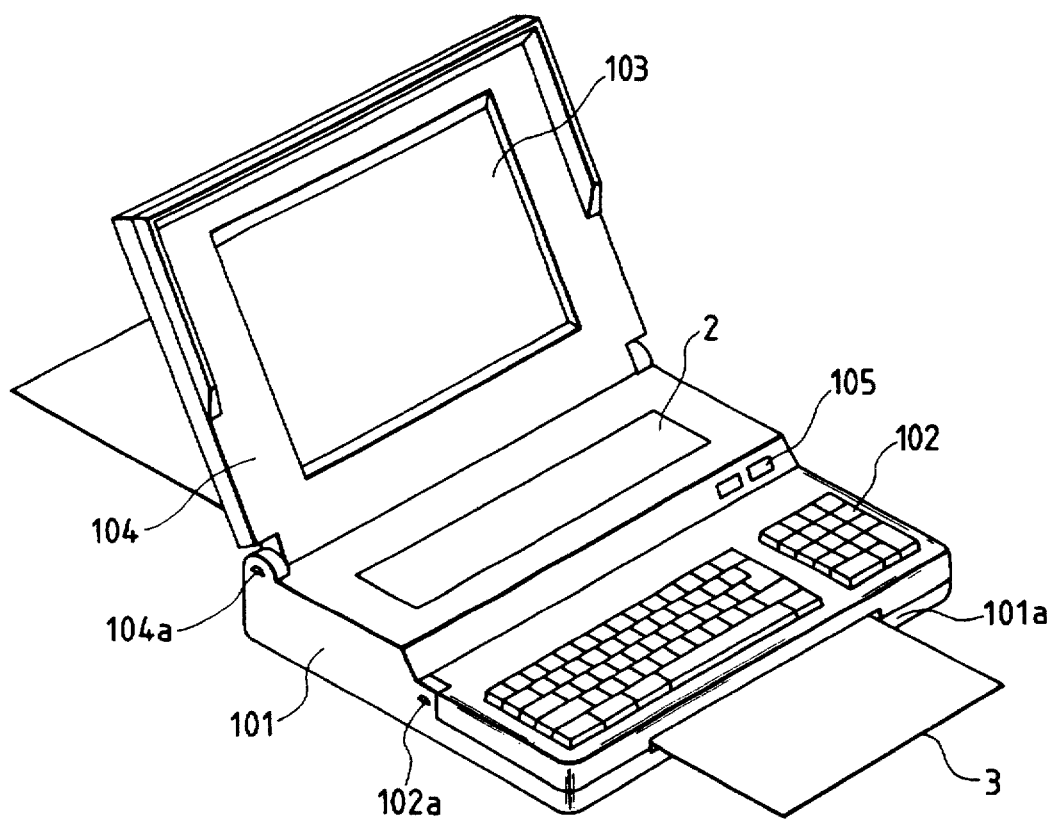
FIG. 1 is a perspective view showing a personal computer in which the present invention is embodied.

FIG. 1 is a perspective view showing a personal computer as a data processing apparatus according to the present invention. A personal computer 1 is constituted by components such as an apparatus main body 101, a keyboard 102, an upper cover 104 having a display unit 103, and a printer unit 2. The upper cover 104 is pivotally mounted on the apparatus main body 101 through hinges 104a mounted at both ends of the rear end of the apparatus main body 101. When the apparatus is in use, the upper cover 104 is pivoted and opened to a position where the display unit 103 can be easily observed by an operator. However, when the apparatus is not used, the upper cover 104 is closed and serves as a cover of the apparatus main body 101. A liquid crystal display element is used as a display element of the display unit 103 because the liquid crystal display element can then have a low profile.

The printer unit 2 using an ink-jet recording head is located in front of the display unit 103 and is housed in the apparatus main body 101. The printer unit 2 has an opening (not shown) which can be opened or closed by the operator, so that the recording head can be easily replaced with a new one.

Recording paper 3 is inserted from a paper feed port 101a formed in the lower portion of the keyboard 102. The recording paper 3 is conveyed through a convey path extending through the apparatus main body 101 and is discharged through a discharge port (not shown) located on the rear side of the apparatus. The keyboard 102 is pivotally mounted through hinges 102a mounted at both side edges of the apparatus main body 101. Even if recording paper having a relatively short length, such as an envelope and a postcard is used, the upper portion of the keyboard 102 can be opened, and the recording paper 3 can be inserted in the convey path. In this manner, since the convey path for the recording paper 3 is formed in the lower portion of the keyboard 102, various operations using the keyboard 102, the display unit 103, and a printer operation switch SW105 can be performed in a state wherein the recording paper is set in the convey path.

Schematic Block Diagram of Host-Printer

Figure 2:
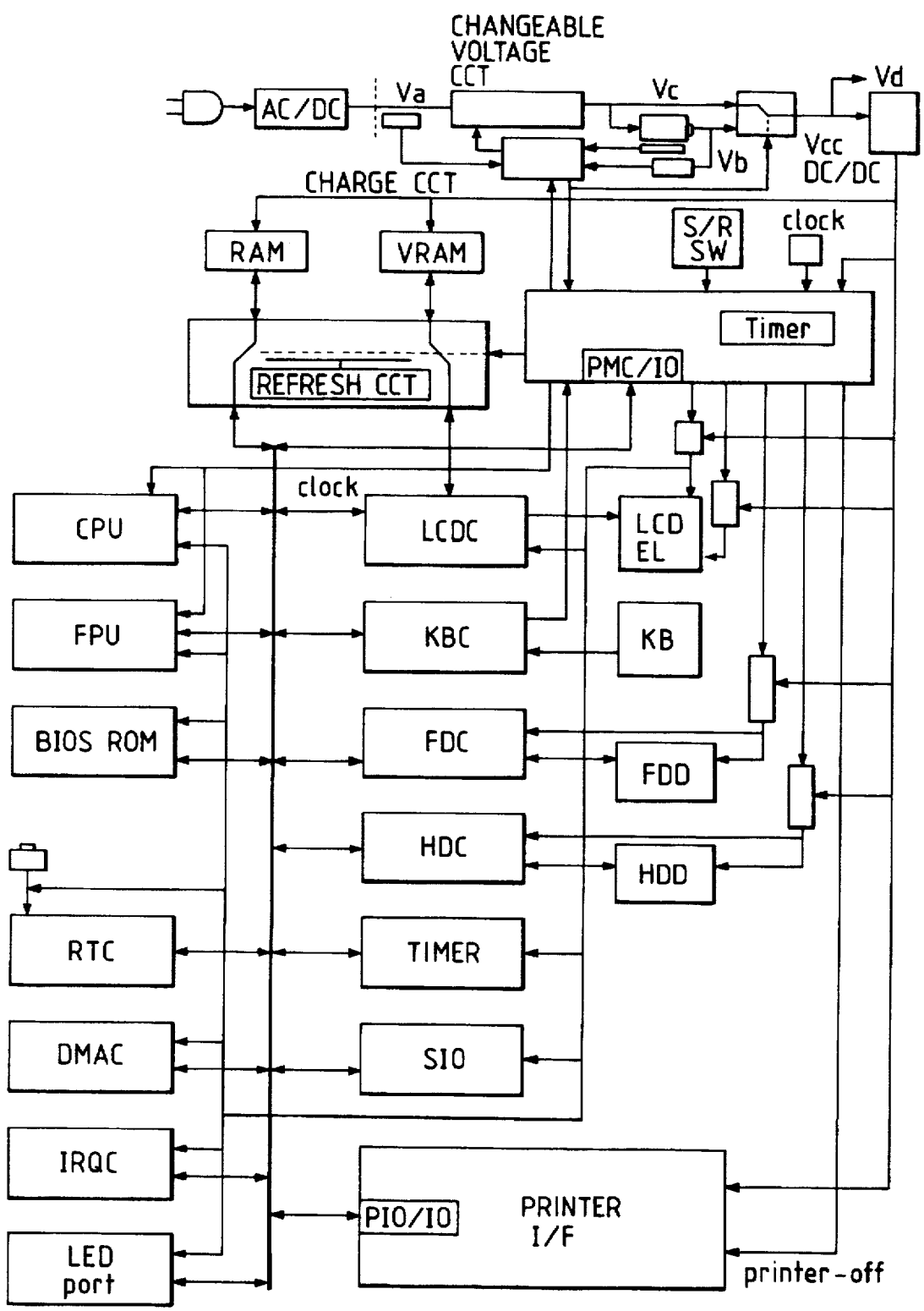
FIG. 2 is a schematic block diagram between a host and a printer.

FIG. 2 is a schematic block diagram of the host computer and the printer.

In the host computer, a central processing unit (CPU) manages main control. A BIOS ROM (Basic Input Output System ROM) instructs basic control of the CPU. An application program is read out from a floppy disc (FDD) or a hard disc (HDD) through a floppy disc controller (FDC) or a hard disc controller (HDC), and the application program is executed. At this time, as screen display method, characters and the like are displayed on a liquid crystal display (LCD) using an LCD controller (LCDC). A key input from the keyboard (KB) is entered through a keyboard controller (KBC). A numeric operation processor (FPU) supports arithmetic processing of the CPU. A real-time clock (RTC) represents a time lapse at the present moment. Even if the system is powered off, the RTC is backed up by an RTC battery. A DMA controller (DMAC) performs data transfer without going through the CPU so as to perform high-speed data transfer between memories, between a memory and an I/O, and between I/Os. An interrupt controller (IRQC) receives an interrupt from each I/O and performs operations in accordance with a priority order. A timer (TIMER) has free-running timers of several channels and performs various time management operations. In addition, the system shown in FIG. 2 includes a serial interface (SIO), an extension port (PORT), and an LED indicating an operating state to the user. The printer is connected to the host computer through a general-purpose parallel I/F. The printer exchanges data on the I/O port register level and has an image equivalent to that exchanged with an external printer.

In addition to the above functions of the general personal computer, a notebook type personal computer must cope with at least two power sources, i.e., an AC adapter and a battery. The notebook type personal computer requires power saving particularly while it is battery-operated. For this purpose, the notebook type personal computer comprises: a host power management unit (host PM unit) for performing time control for an on/off operation of an EL inverter, power supply to the FDD, power supply to the HDD, a printer-off operation, power supply to devices except for the RAM and VRAM, CLOCK control of the CPU and the like, and power supply control procedures in a suspend/resume mode; a refresh controller for switching to refresh the RAM and VRAM between the suspend mode and a CPU-CLOCK mode in accordance with an instruction signal from the host PM unit; and a charge controller capable of driving the host while charging the secondary battery.

Block Diagram of Printer

Figure 3:
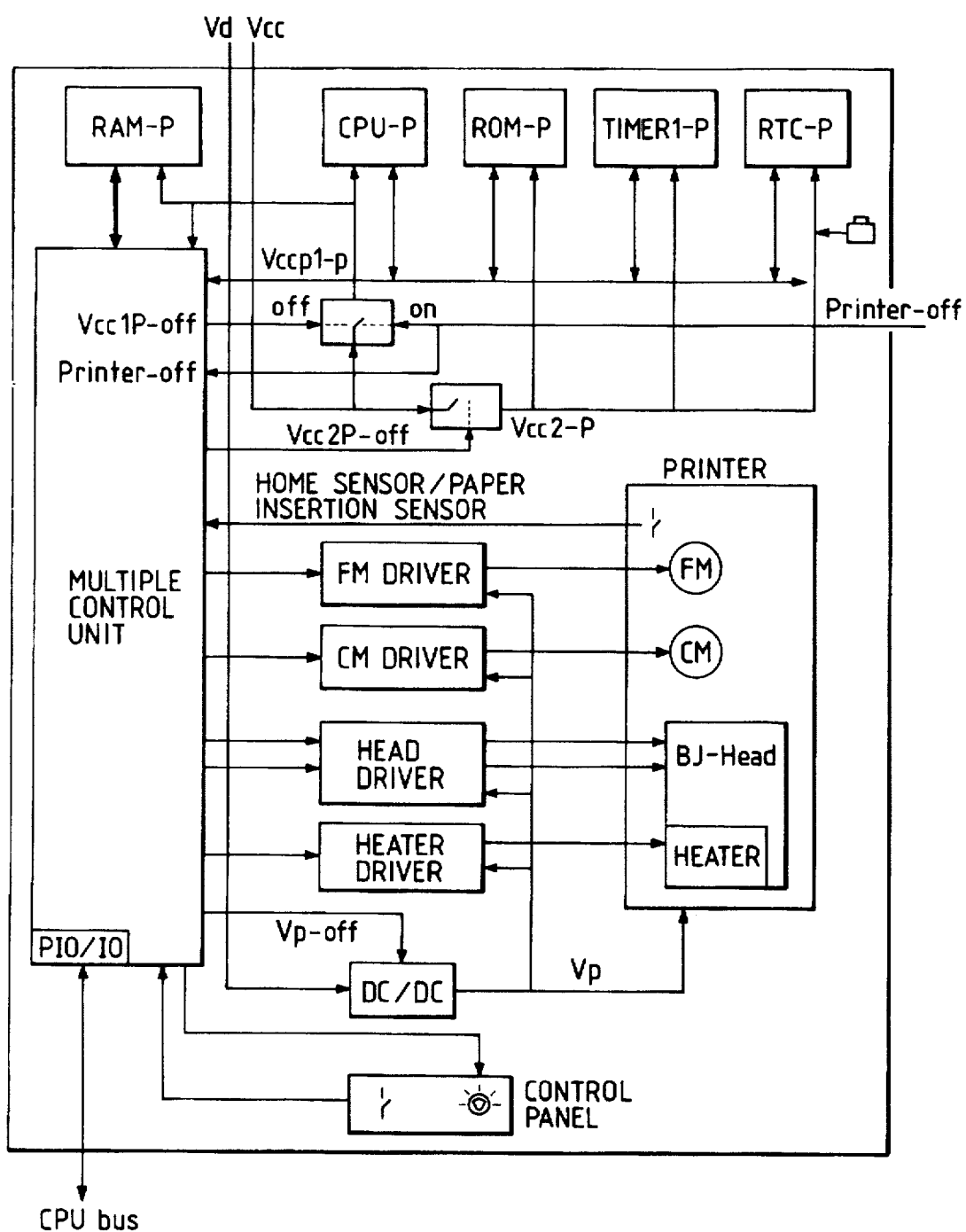
FIG. 3 is a block diagram of a printer I/F.

FIG. 3 is a block diagram showing an arrangement of a control system of the printer unit.

A CPU-P is a CPU in the form of a microprocessor for performing main control of the printer unit. The CPU-P performs desired processing on the basis of a printer command and data supplied from the host computer through a parallel IF (to be described later). A ROM-P is a ROM for storing programs corresponding to a recording control sequence and the like executed by the CPU-P, a character generator (CG), and any other permanent data. A RAM-P is a RAM which has a work area used as a register, a line buffer for storing one-line print data, a dot development buffer for storing the data developed into dots, and an input buffer from the parallel IF. A TIMER1-P is a timer for obtaining a drive phase time of a paper feed motor (FM), a heater, or the like. An RTC-P is an RTC for detecting a time lapse required for a recovery operation. A multiple control unit for integrally performing IF transfer control, power saving control, RAM access control, and printer port control is connected to the bus of the CPU-P. Printer drive control signals are output from the multiple control unit and are converted into FM, CM, BJ-Head, and heater drive levels by an FM driver, a CM driver, a head driver, and a heater driver, respectively. The energy saving signals are a Vcc1P-off, Vcc2P-off, and Vp-off power control signals from the multiple control unit, and input signals are a Printer-off signal, printer sensor signals, and control panel signals. Of these signals, the Vcc1-P power supply is performed only when the Printer-off signal is changed from an active level to an inactive level, and power is supplied to only to the multiple control unit, the CPU-P, and the RAM-P. The Vcc1P-off signal can disconnect the Vcc1P power when the Printer-off signal is changed to OFF in accordance with the printer drive state. That is, the head is not powered off in a open cap state, and a decisive failure can be prevented.

Figure 6:
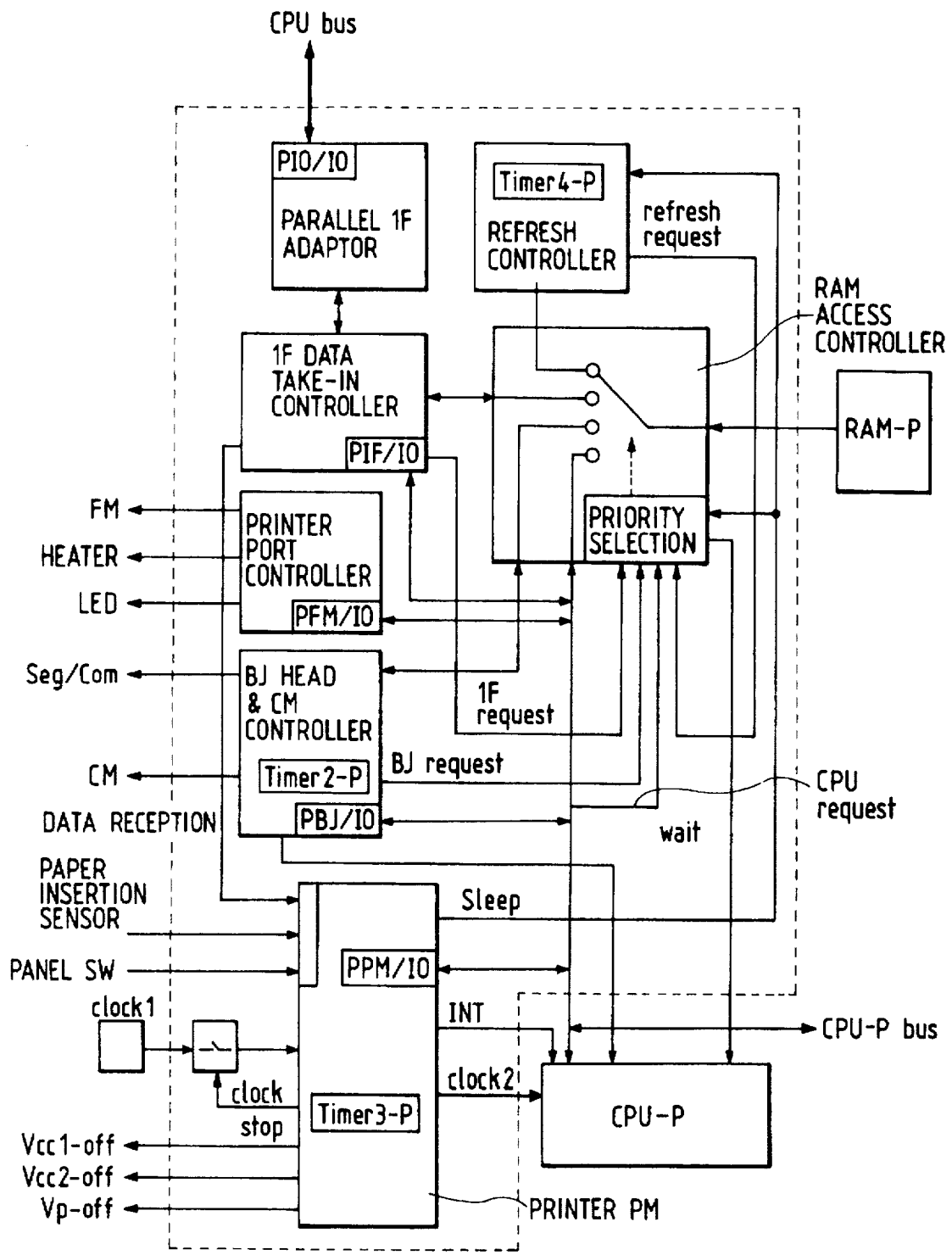
FIG. 6 is a block diagram showing an internal arrangement of a multiple control unit.

FIG. 6 is a block diagram showing an arrangement of the multiple control unit. The functional blocks of this arrangement are a parallel IF adapter mainly serving as a host IF adapter, an IF data take-in controller for storing parallel data in the input buffer (IB) of the RAM-P through the parallel IF adapter, a refresh controller for generating a refresh timing for the RAM-P, a BJ head & CM controller for reading out one-line dot development data (PB) in the RAM-P and controlling phase excitation of the carrier while a BJ head is driven to perform printing, a printer port controller for driving the FM driver, the heater driver, and an LED driver, and a RAM access controller having access rights in a priority order for four access requests, i.e., access requests of the IF data take-in controller, the refresh controller, the BJ head & CM controller, and the CPU-P.

A printer PM controller receives a data reception signal generated upon reception of data from the IF data take-in controller, an edge input signal from a paper insertion sensor, and an edge signal from the panel SW and supplies an INT signal shown in FIG. 6 to the CPU-P, thereby performing a hard interrupt. A relationship between the hard interrupt and software processing will be described with reference to software control later.

Figure 7:
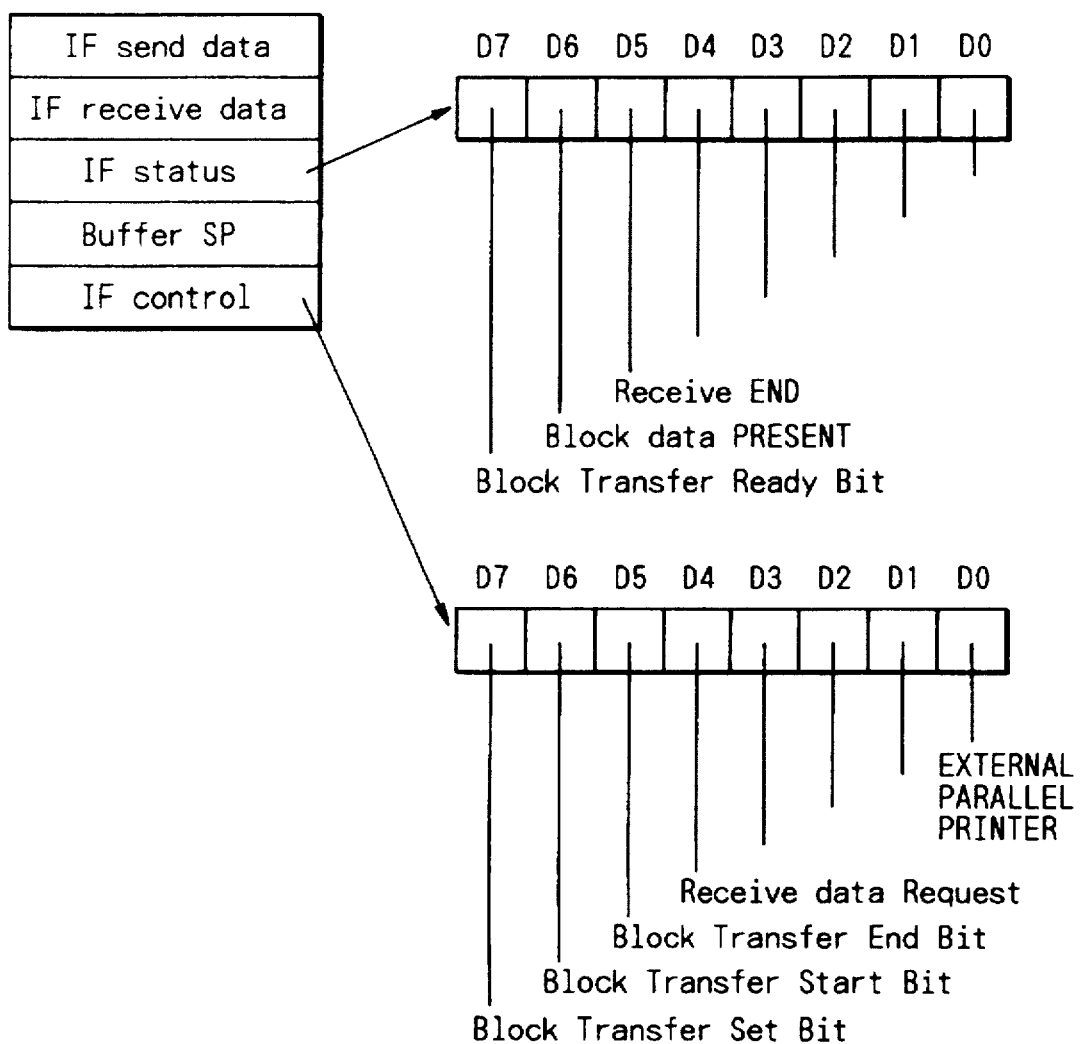
FIG. 7 is a view showing an arrangement of a PIO/IO register.

FIG. 7 shows an arrangement of an I/O register (PIO/IO) of the parallel IF adapter when viewed from the host. The I/O register consists of IF data, IF status, and IF control registers.

Figure 8:
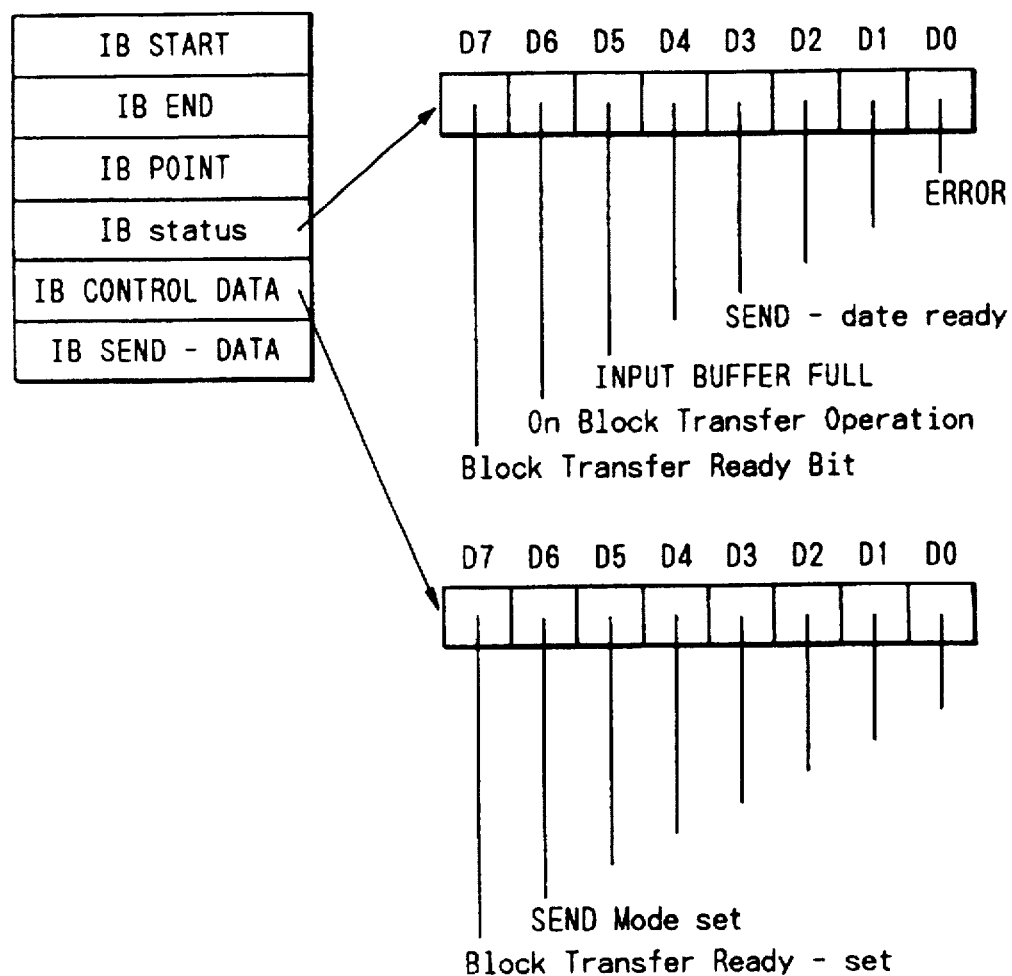
FIG. 8 is a view showing an arrangement of a PIF/IO register.

FIG. 8 shows an arrangement of an I/O register (PIF/IO) in the IF data take-in controller when viewed from the printer. The I/O register includes IB start, IB end, IB POINT, IB status, IB control data, and IB send data registers.

Figure 9:
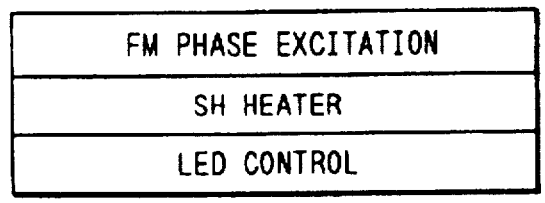
FIG. 9 is a view showing an arrangement of a PFM/IO register.

FIG. 9 shows an arrangement of an I/O register (PFM/IO) in the printer port controller when viewed from the printer. The I/O register consists of an FM phase excitation, SH heater signal, and LED control registers.

Figure 10:
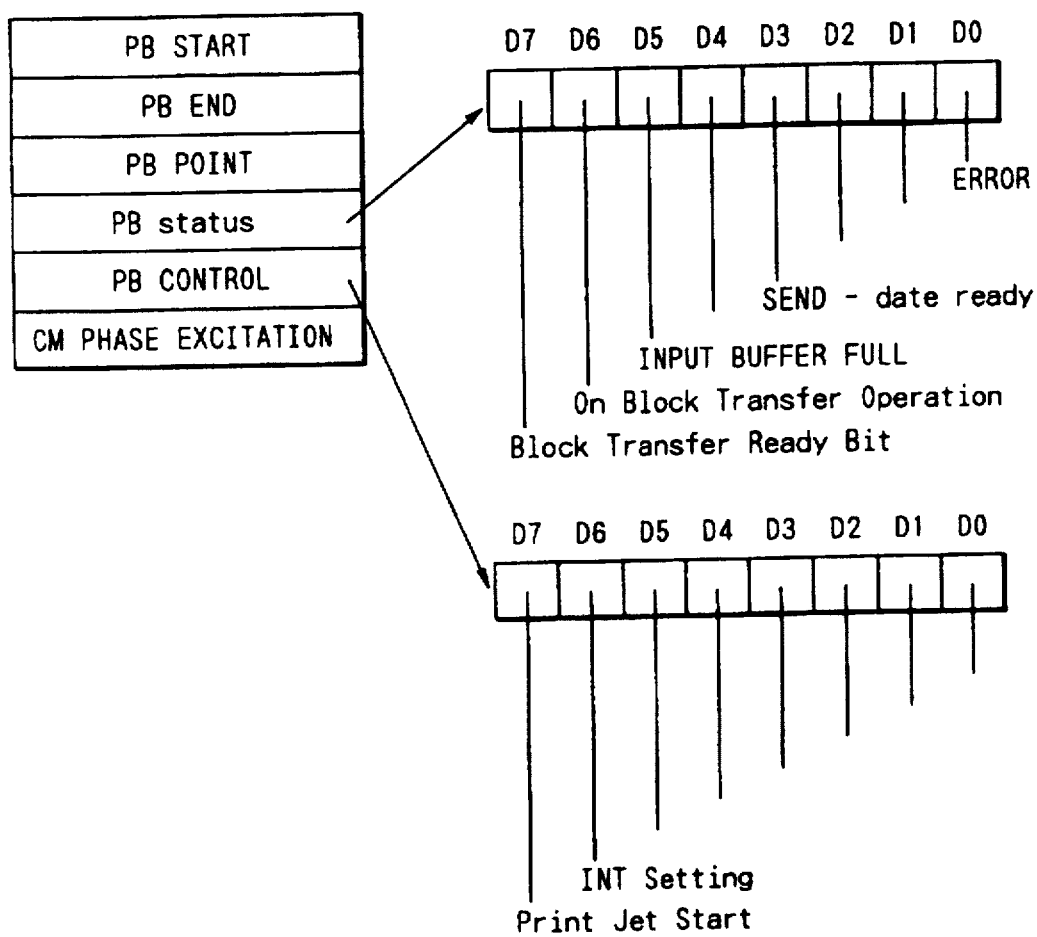
FIG. 10 is a view showing an arrangement of a PBJ/IO register.

FIG. 10 shows an arrangement of an I/O register (PBJ/IO) in the BJ head & CM controller when viewed from the printer. The I/O register consists of PB start, PB end, PB POINT, PB status, PB control data, and CM phase excitation registers.

Figure 11:
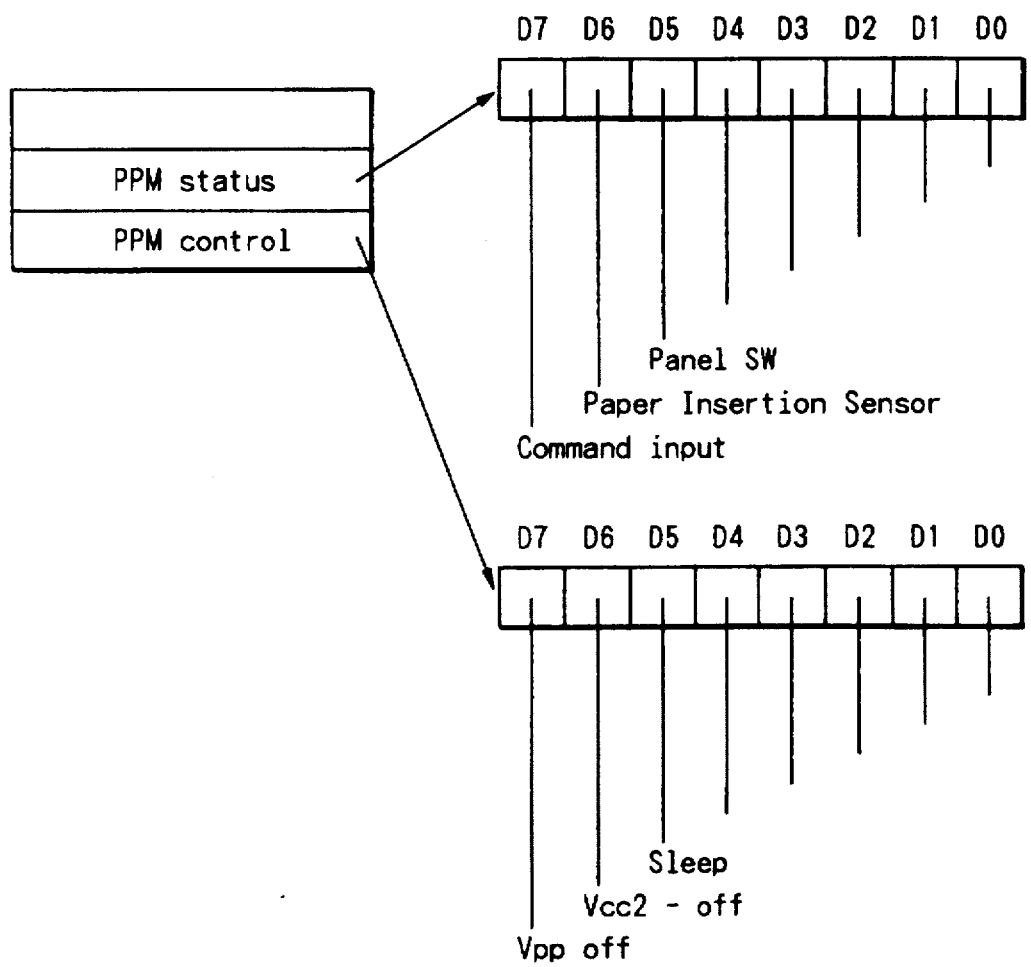
FIG. 11 is a view showing an arrangement of a PPM/IO register.

FIG. 11 shows an I/O register (PFM/IO) in the printer PM controller when viewed from the printer. The I/O register consists of PPM status and PPM control data registers.

Figure 12:
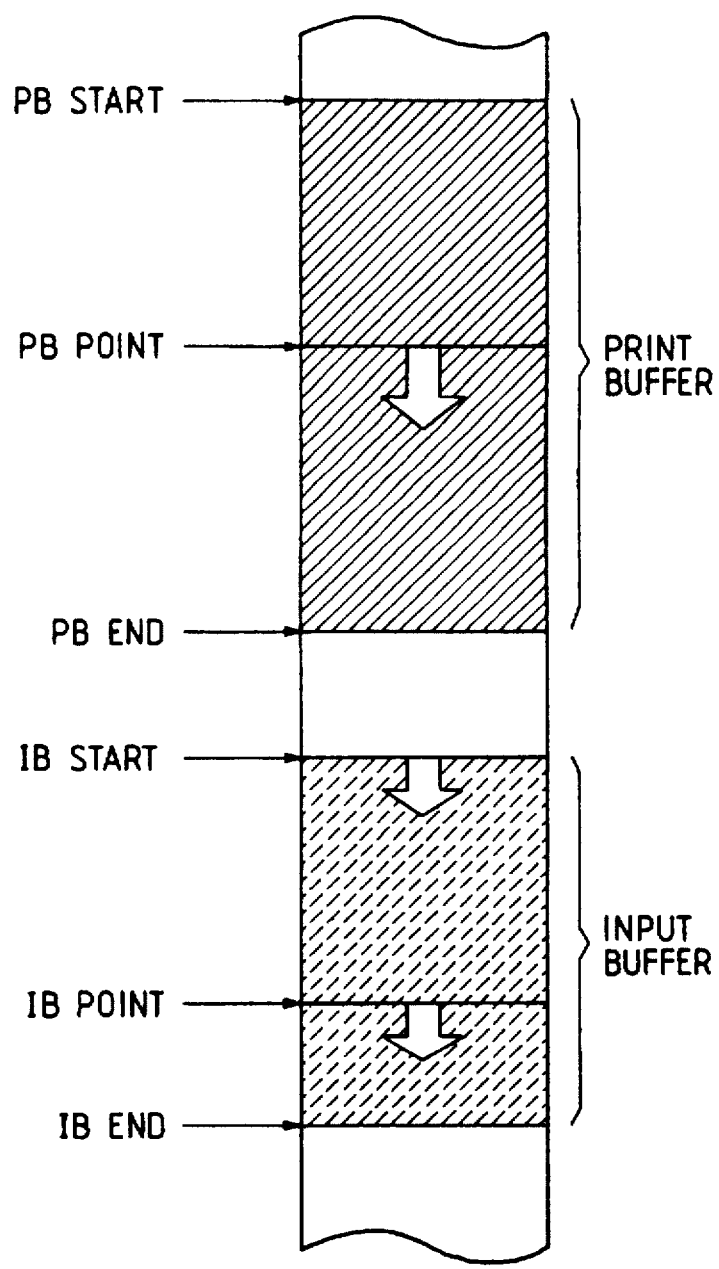
FIG. 12 is a view showing PB (Printer Buffer) and IB (Input Buffer) address areas of a printer RAM-P.

FIG. 12 shows address area allocation in the RAM-P of FIG. 3, representing a print buffer (PB) for controlling the BJ head & CM controller and a reception buffer (IB) for controlling the IF data take-in controller.

The print buffer area is used to set a data area required for data printing. A start address (PB START) and an end address (PB END) of the print buffer area are set to sequentially read out the storage data from the start address within the range of the buffer area under the control of the BJ head & CM controller. The storage data is read out up to the end address from the RAM-P and a control signal is supplied to the head driver. At this time, a print data address pointer (PB pointer) represents a data address of currently sent data.

The reception data buffer (equivalent to an INPUT BUFFER to be described later) area is used to set a data area required for data reception. A start address (IB START) and an end address (IB END) of the reception data buffer are set. Storage data are sequentially read out from the start address within the designated range under the control of the IF data take-in controller. The storage data are read out from the RAM-P up to the end address, thereby sending a control signal to the head driver. At this time, a reception data address pointer (IB pointer) represents a data address of the currently received data.

Circuit Diagram of Arrangement of Printer Driver

Figure 4:
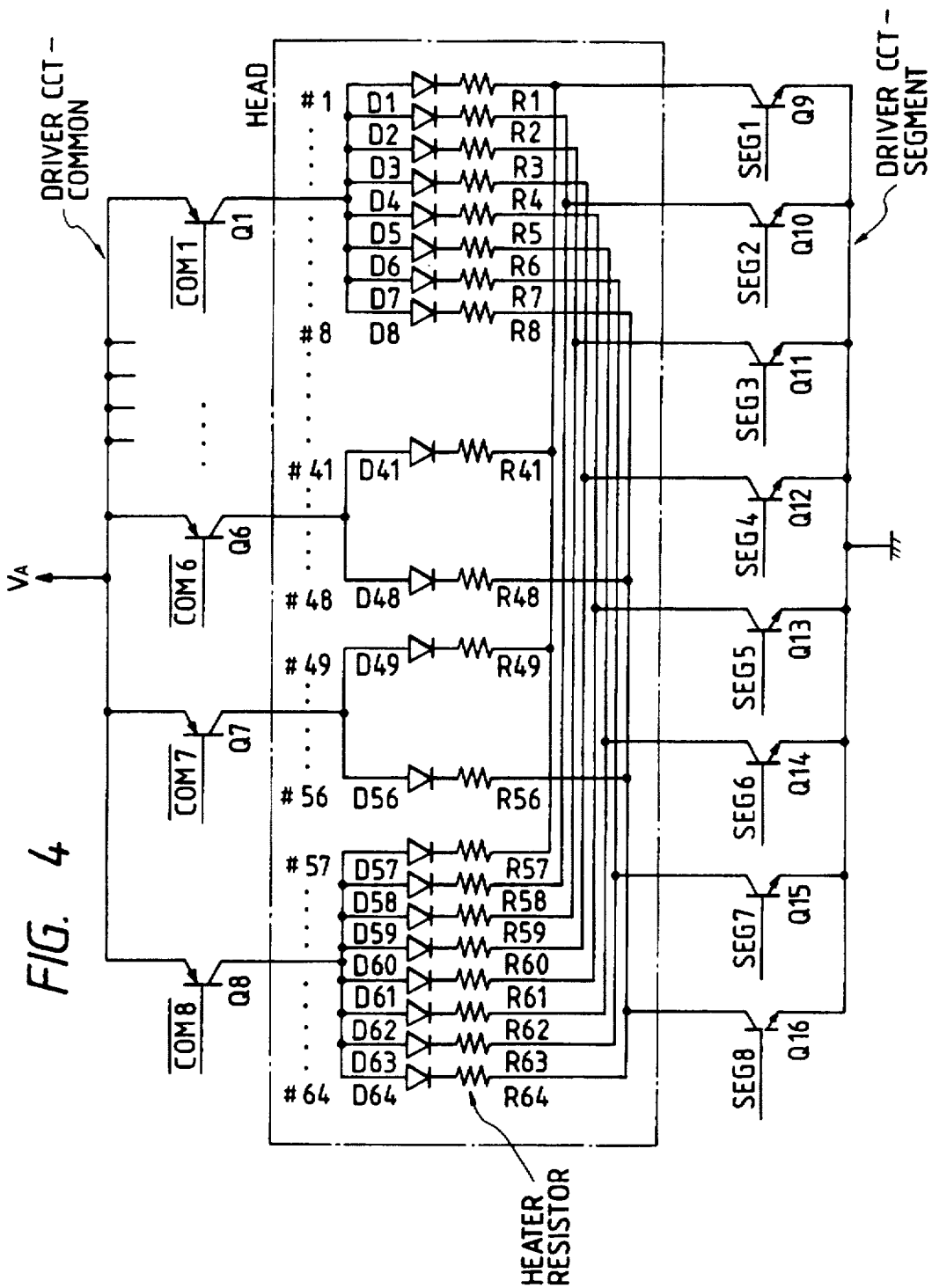
FIG. 4 is a circuit diagram of a recording head and a head driver.

FIG. 4 shows arrangements of the recording or BJ head and the head driver.

A jet unit of this embodiment has 64 orifices, the positions of which are respectively numbered with #1 to #64. Heater resistors R1 to R64 serve as jet energy generation elements arranged in correspondence with orifices #1 to #64, respectively. The heater resistors R1 to R64 are divided into blocks each consisting of eight heater resistors. Switching transistors Q1 to Q8 of a driver circuit-common are respectively connected to the blocks, respectively. The transistors Q1 to Q8 enable or disable energization paths in accordance with ON/OFF states of control signals COM1 to COM8, respectively. Reverse bias preventive diodes D1 to D64 are respectively located in the energization paths to the heater resistors R1 to R64.

ON/OFF transistors Q9 to Q16 of a driver circuit-segment are connected to the heater resistors located at corresponding positions between the blocks. The transistors Q1 to Q16 enable or disable energization paths to the heater resistors in accordance with ON/OFF states of control signals SEG1 to SEG8.

Figure 5:
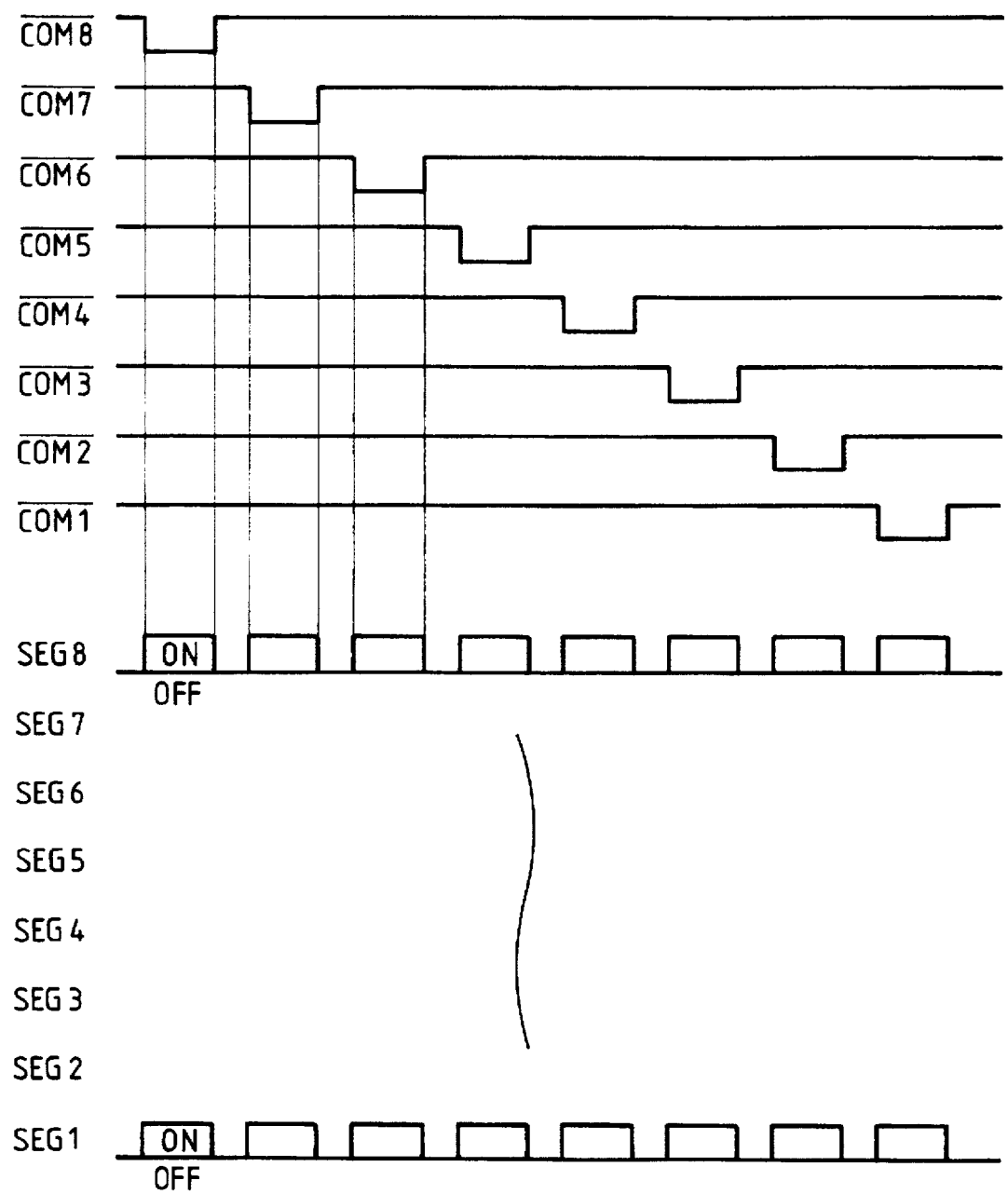
FIG. 5 is a timing chart for driving the head.

FIG. 5 is a timing chart of head driving in the above arrangement. At a given position in a head scanning direction, the common control signals COM8 to COM1 are sequentially enabled. By this enable operation, one block is selected and is set in an energization enable state. The segment control signals SEG8 to SEG1 are enabled or disabled in accordance with an image within the selected block, so that the heater resistors are selectively energized. Ink jets are formed upon heating to perform dot recording.

Figure 13:
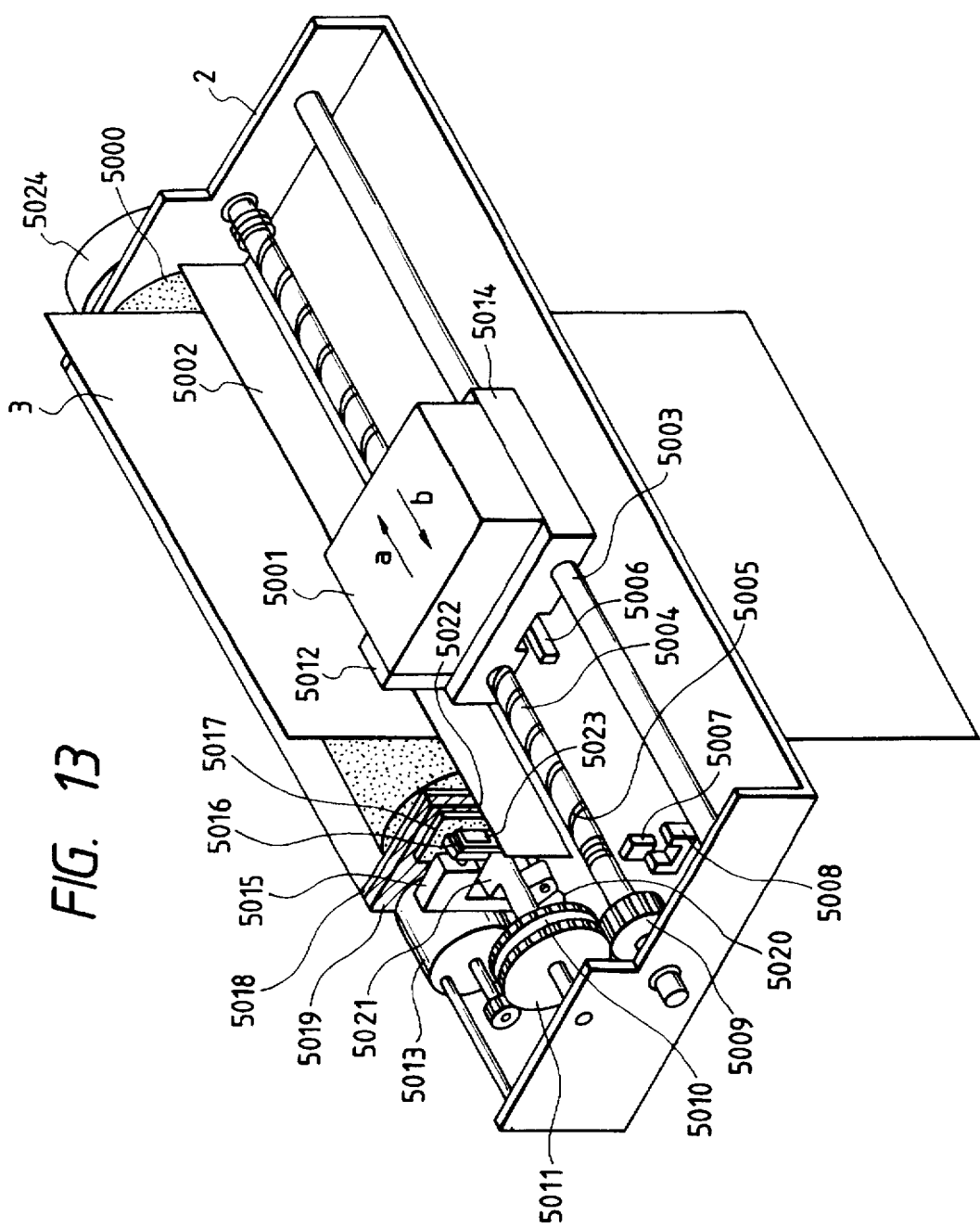
FIG. 13 is a perspective view showing a printer internal unit.

FIG. 13 is a perspective view for explaining the internal arrangement of the printer unit 2 using an ink-jet recording scheme in or to which the present invention is embodied or applied. Referring to FIG. 13, the printer unit 2 comprises an ink tank 5001 and a recording head 5012 connected to the ink tank 5001. The ink tank 5001 and the recording head 5012 constitute a replaceable integral cartridge. The cartridge is mounted on a carriage 5014. The carriage is scanned by a guide 5003 in a subscanning direction.

A platen roller 5000 scans the recording paper 3 in the main scanning direction. The platen roller 5000 is rotated by a paper feed motor 5024 for rotating the platen roller 5000. A flexible cable (not shown) for supplying a head drive signal pulse and a temperature control current to the recording head 5012 is connected between the carriage 5014 and a printed circuit board (not shown) having an electrical circuit for controlling the printer.

The printer unit 2 having the above arrangement will be described in detail below. The carriage 5014 engaged with a helical groove 5004 of a lead screw 5005 rotated through driving force transmission gears 5011 and 5009 interlocked with forward or reverse rotation of a drive motor 5013 has a pin (not shown) and is reciprocated in directions indicated by arrows a and b. A paper press plate 5002 presses the paper against the platen 5000 along the carriage movement direction. Photocouplers 5007 and 5008 serve as home position detecting means for detecting the presence of a lever 5006 of the carriage 5014 within the range defined by the photocouplers 5007 and 5008 to change the rotational direction of the motor 5013. A member 5016 supports a cap member 5022 for capping the front surface of the recording head. A suction means 5015 draws air from the cap to recover the recording head 5012 through an opening 5023 in the cap member 5022.

A cleaning blade 5017 is moved back and forth by a member 5019. The cleaning blade 5017 and the member 5019 are supported on a main body support plate 5018. The blade having the form described above need not be used, but a known cleaning blade can be applied to this embodiment. A lever 5021 for starting suction in suction recovery is moved together with movement of a cam 5020 engaged with the carriage 5014. A driving force from the drive motor is controlled by a known transmitting means such as a clutch switching mechanism.

When the drive motor 5013 is rotated from the home position of the carriage 5014 in the reverse direction, the power transmission gear 5011 is switched to a power transmission gear 5010 (although this switching is not illustrated), so that the driving force from the drive motor 5013 is transmitted to the lever 5021 through the cam 5020. Therefore, capping, cleaning, and suction recovery of the recording head 5012 are performed.

Figure 14:
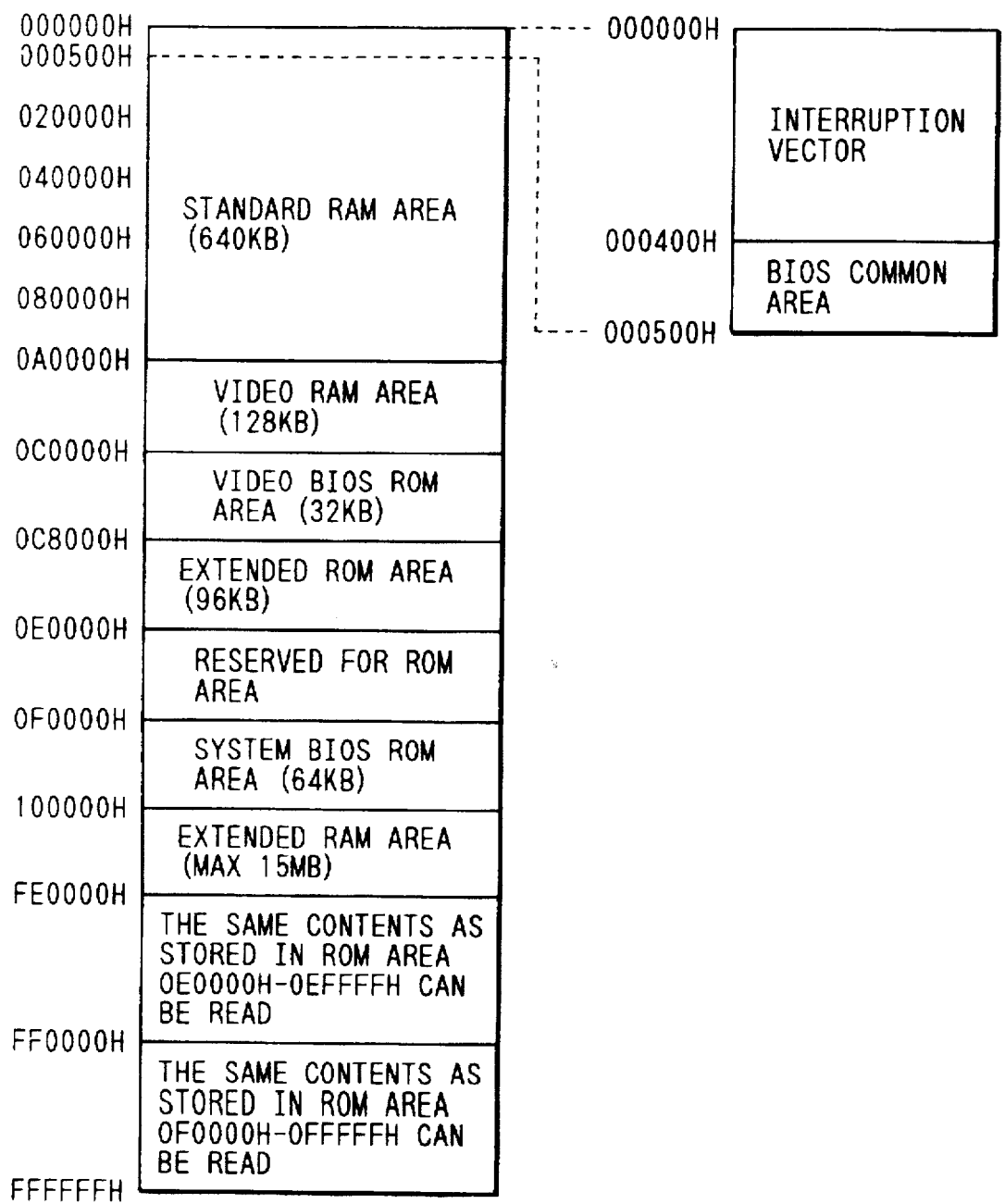
FIG. 14 is a memory space address map of the host.

FIG. 14 shows a detailed arrangement of a memory map of the host RAM in FIG. 2. The RAM has a standard area having addresses 0000h to A0000h and an extended area having addresses 10000h to FE0000h. The standard area has a 640-KB capacity, and the extended area has a 15-MB capacity. The RAM is mapped to have these areas.

A start portion of the standard RAM area which has addresses 00000h to 000400h is allocated as an area for storing an interruption vector. This area stores entry addresses of the respective processing operations for this interrupt.

A video RAM area and a video BIOS ROM area in FIG. 14 are allocated in the LCDC of FIG. 2. A video control program is stored in the video BIOS ROM area. Video display data is held in the video RAM area.

An area having addresses C8000h to E0000h serves as an extended ROM area. This area serves as a ROM area used by an extension port and the like.

An area having addresses F0000h to 10000h is allocated in the ROM BIOS area and stores a BIOS program for performing various I/O processing operations.

FIG. 15 shows an address map of each I/O. Data can be exchanged between the respective hardware arrangements by the read and write operations with respect to the address ports set in the respective hardware arrangements. A keyboard will be taken as an example. The data are exchanged between the memory and the keyboard controller through ports allocated at the addresses 60h to 64h. The data reception port is read-accessed to receive data from the keyboard.

Similar processing operations are performed for other addresses.

Areas represented by parallel Centronics 1 to parallel Centronics 3 represent interface areas which are common in the I/O space to the printer interface area.

FIGS. 16 and 17 show contents of the interruption vector in FIG. 14 in detail. An area having addresses 0h to Fh is allocated as a hardware interrupt area, and an area from address 10h is located to a software interrupt.

A program at an address registered in each entry is executed in response to the corresponding interrupt. Addresses for a ROM BIOS program and a program stored in the RAM are set in the entries. When a hardware or software interrupt is generated, the corresponding processing is executed, and the respective operations are performed.

Each processing after a power-ON operation will be described below.

In the flow chart of the power-ON operation in FIG. 18, the flow advances to step S1. Soft reset processing by the keyboard is also executed in step S1 upon the power-ON operation. In step S1, POST processing is performed. The POST processing is power on self-test processing to test and initialize each hardware arrangement. The flow advances to step S2 to load a boot program for starting a system program. The boot program is stored in an FD (floppy disc) or HD (hard disc) and is located at, e.g., track 0 and sector 0. The contents at track 0 and sector 0 are taken into a memory to load the boot program. Steps S1 and S2 are performed within the ROM BIOS. The flow advances to step S3 to execute the loaded boot program. The boot program is a program for loading a program for loading an OS program from the FD or HD. The flow advances to step S4 to load the OS load program. The flow advances to step S5 to execute the OS load program. The OS load program is a program for loading the OS in the memory. In step S6, an I/O driver is loaded. The I/O driver is a program for controlling an I/O. The OS can exchange data with each I/O by means of the I/O driver. The flow advances to step S7 to test and initialize the I/O. The flow advances to step S8 to load the OS in the memory. Up to this step, preparation for executing the OS is completed. The flow advances to step S9 to execute the OS. The OS processes inputs from the keyboard and displays various messages on the display unit to perform data exchange with the operator. The OS executes various commands in accordance with various command inputs by the operator.

Figure 19:
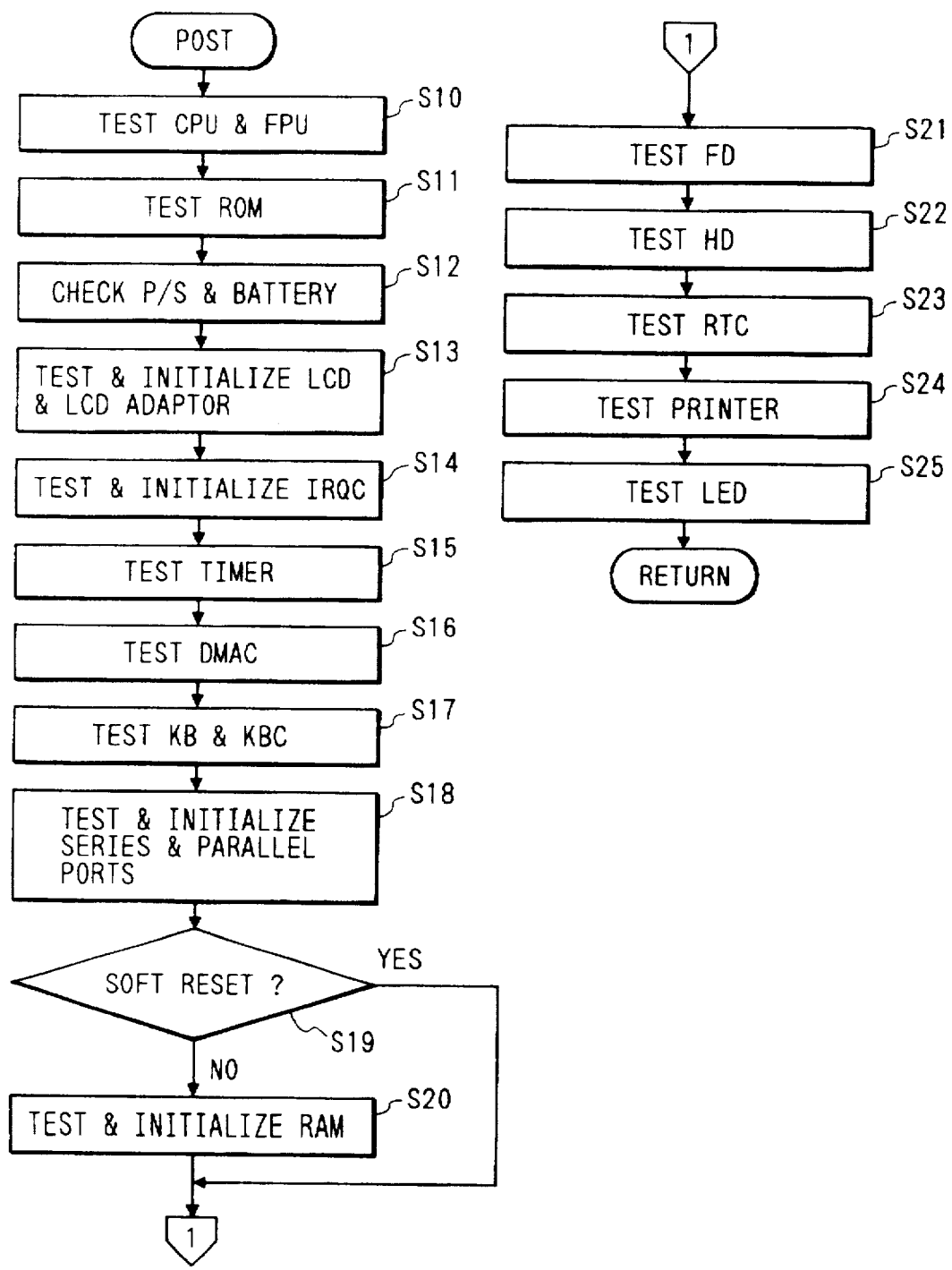
FIG. 19 is a flow chart of a POST (Power On Self-Test)

FIG. 19 is a flow chart for explaining the POST processing in step S1 of FIG. 18 in detail. The FPU (numerical operation processor) shown in FIG. 2 is tested (step S10). The ROM is tested (step S11). The power source (P/S) and the battery are checked (step S12). The LCD and the LCD adapter are tested and initialized. The LCD adapter includes the RAM and ROM, so that the RAM and ROM are also checked (step S13). An interrupt controller (IRQC) is tested and initialized (step S14). A timer is then tested (step S15). The DMA controller is tested (step S16). The keyboard (KB) and the keyboard controller (KBC) are tested (step S17). The serial and parallel ports are tested and initialized (step S18). It is then checked if soft reset is made (step S19). If YES in step S19, the test and initialization of the RAM in step S20 is skipped, and the flow advances to step S21. However, if NO in step S19, the flow advances to step S20 to test and initialize the RAM. The FD (floppy disc) is then tested (step S21). The HD (hard disc) is tested (step S22). The real-time clock (RTC) is tested (step S23). The printer is tested (step S24). In this case, the printer is tested to check various printer ports and a printer connection. The LED is then tested (step S25). The flow then returns to the main routine in FIG. 18. By the above processing operations, the POST processing in step S1 in FIG. 18 are completed. If errors occur in devices, error messages are displayed.

Figure 20:
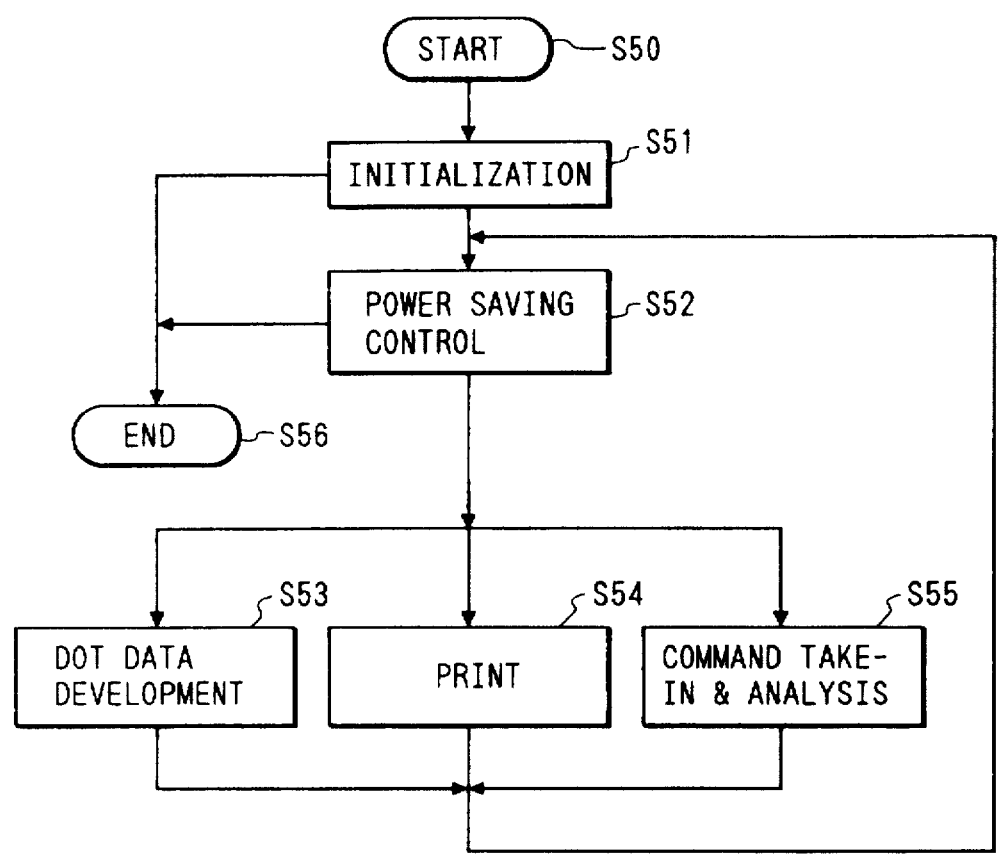
FIG. 20 is a control flow chart of a printer CPU-P.

FIG. 20 is a flow chart of printer soft control.

Initialization is performed in step S51. If a Printer-off signal is sent from the host to the printer, the flow is ended in step S56. However, if the Printer-off signal is not sent from the host to the printer, the flow advances to step S52. In power saving control in step S52, if a Printer-off signal is set from the host to the printer, the flow is ended in step S56. However, if the Printer-off signal is not set from the host to the printer, parallel processing in steps S53, S54, and S55 is executed. More specifically, step S53 executes dot data development processing for developing character code data in the line buffer into one-line dot data. Step S54 executes a series of print processing operations performed when the dot data of the next line is ready and a print start command of this line is executed or when a sequential execution command is executed. Step S55 executes a command take-in analysis for interpreting a command and data which are taken into the input buffer and forming a line buffer. When the processing operations in steps S53, S54, and S55 are completed, the flow returns to power saving control processing in step S52.

Figure 21:
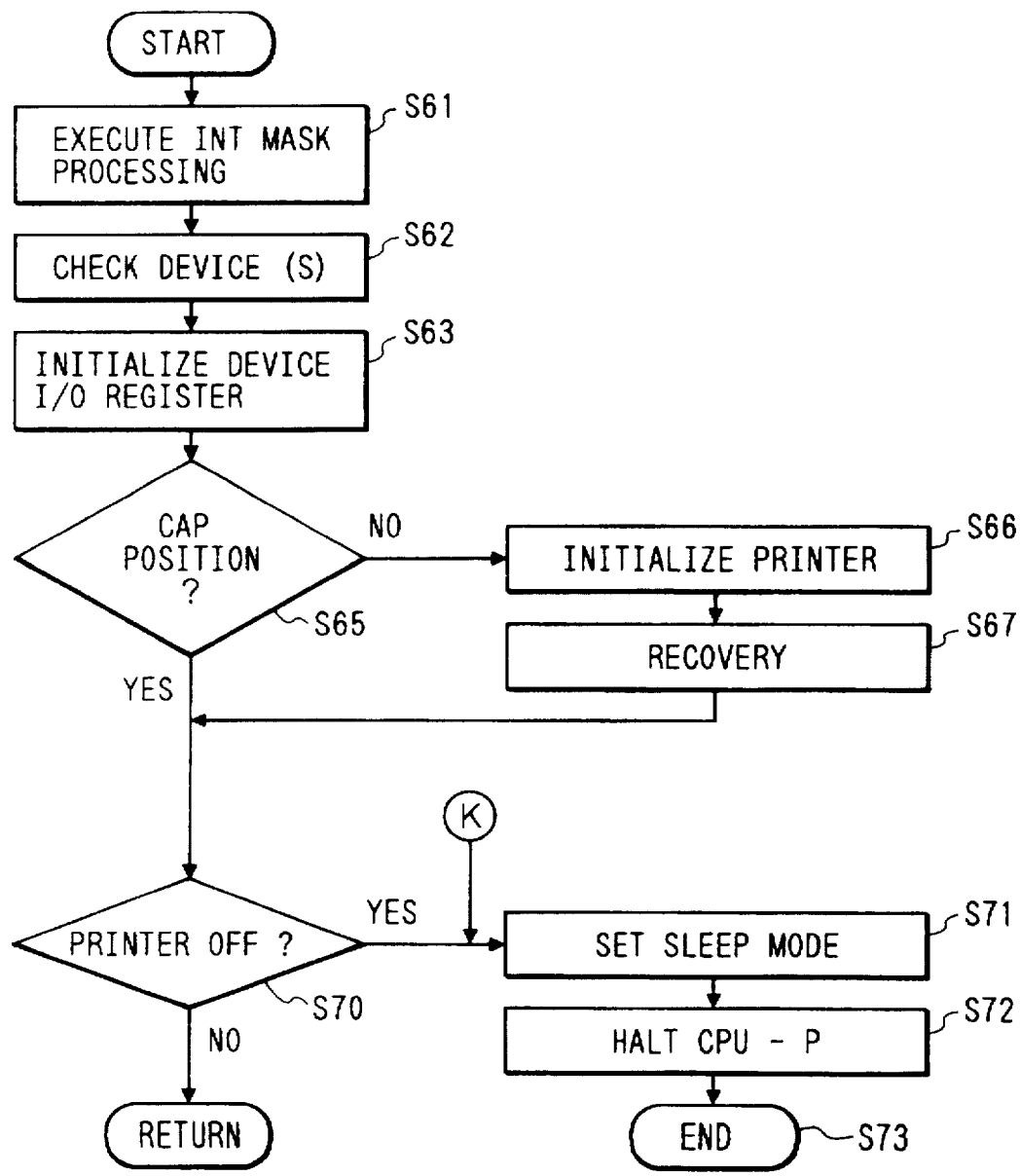
FIG. 21 is a control flow chart of initialization of the printer CPU-P.

FIG. 21 is a detail flow chart of initialization in FIG. 20.

Interrupt (Int) mask processing is performed in step S61, and the flow advances to step S62. In step S62, devices such as the ROM-P, the RAM-P, and the TIMER-P are checked. The flow then advances to step S63. In step S63, the device I/O register for setting the above-mentioned registers (PIF/ IO, PFM/IO, and PPM/IO) in desired set conditions is initialized. The flow then advances to step S65 to check if the printer is set in a cap position. If YES in step S65, the flow advances to step S70. However, if NO in step S65, printer initialization processing for performing mechanical positioning of the printer and subsequent recovery processing for capping the head after recover suction is repeatedly performed until an ink is discharged are performed in step S66, and the flow advances to step S70. It is checked in step S70 if a Printer-off signal is present in the printer. If YES in step S70, a series of operations in steps S71, S72, and S73 are performed as CPU-P procedures which serve as transition procedures to a Sleep Mode to be described below. The Sleep Mode is set in the PPM/IO register, and the CPU-P is set in the Halt Mode. However, if NO in step S70, the flow returns to the main flow.

Figure 26:
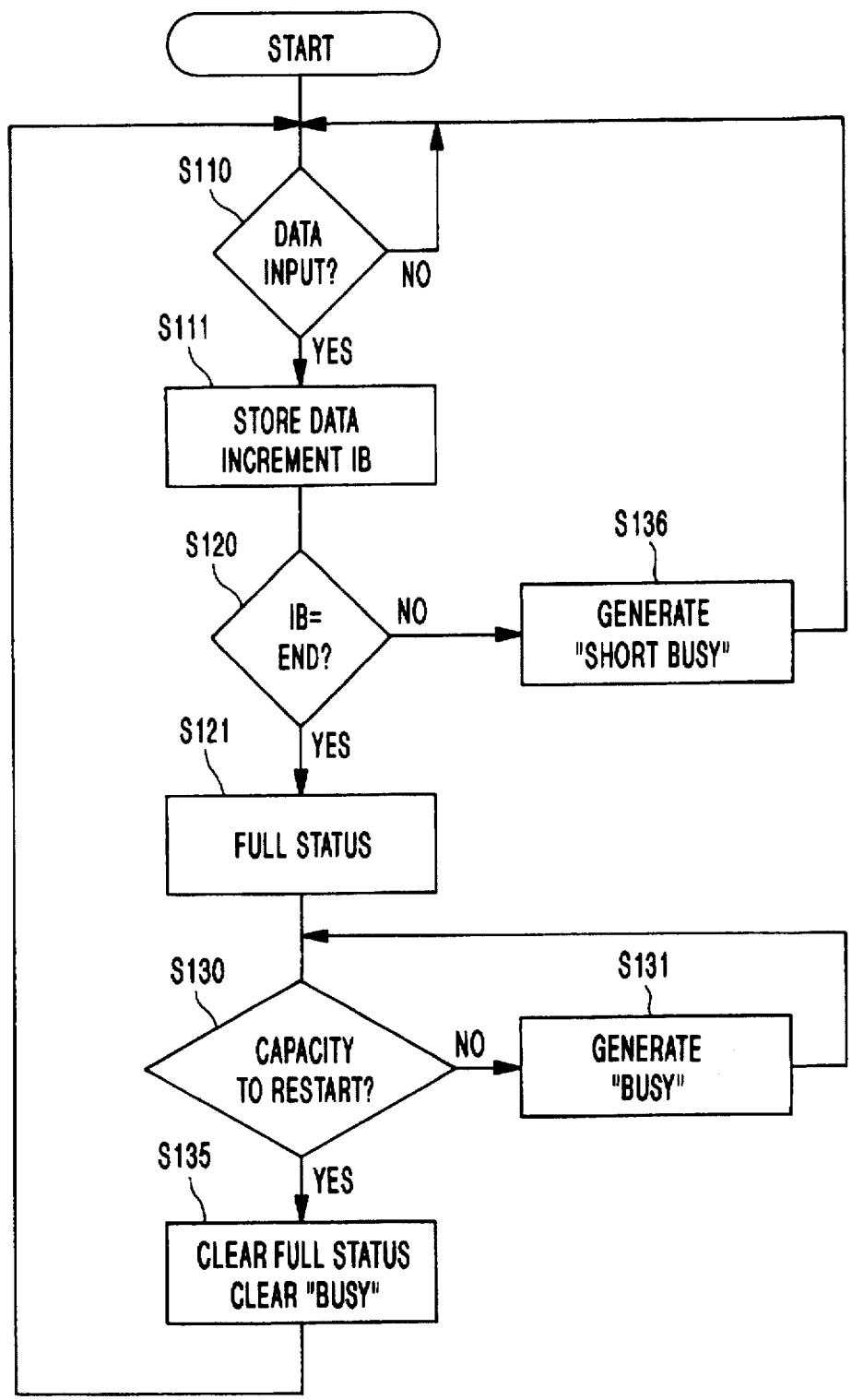
FIG. 26 is a control flow chart of processing in the IF take-in controller.

FIG. 26 is a detailed flow chart showing control by the IF take-in controller of the multiple control unit in FIG. 6. Note that this control may be performed by the parallel IF adapter shown in FIG. 6. It is checked in step S110 if data is transferred from the parallel IF adapter, i.e., if the data input is detected. If YES in step S110, the flow advances to step S111. However, if NO in step S110, the flow returns to step S110 again. In step S111, the input data is stored at an address (IB POINT+1) with reference to the current IB POINT in the IB area described in FIGS. 8 and 12, and the POINT value is incremented by one. The flow then advances to step S120. It is checked in step S120 if the IB point value is equal to the IB END value. If YES in step S120, the flow advances to step S121. This check is performed by checking if the input buffer (reception buffer in FIG. 12) is full. However, the check may be made by checking if the empty area has a predetermined amount or less. If NO in step S120, the flow advances to step S136 to generate a dummy "BUSY" for generating a virtual short "BUSY" in the "BUSY" in the IF status register, and the flow returns to S110. In step S121, an "INPUT BUFFER FULL" is generated in the IB status register of the PIF/IO register (FIG. 8) serving as the I/O register in the IF take-in controller shown in FIG. 6, and the flow advances to step S130.

It is checked in step S130 if an actual empty capacity from the IB END to the IB POINT is equal to an IB resumption-start capacity in the PIF/IO register in FIG. 8. If YES in step S130, the flow advances to step S135. However, if NO in step S130, the flow advances to step S131. In step S131, a "BUSY" is generated in the IF status register of the PIO/IO register (FIG. 7) serving as the host I/O register in the parallel IF adapter shown in FIG. 6, and the flow returns to step S130. In step S135, the "INPUT BUFFER FULL" is cleared in the IB status register in the PIF/IO register in FIG. 8. At the same time, the "BUSY" is cleared in the IF status register in the PIO/IO register in FIG. 7, and the flow returns to step S110.

That is, in the processing having an order of S110, S111, S120, S136, and S110, data is repeatedly taken in until the IB POINT coincides with the IB END, i.e., until the input buffer becomes full. Every time the data is taken in, a virtual short "BUSY" is generated. In the processing having an order of S120, S121, S130, S131, and S130, control is made to continuously generate BUSY signals viewed by the host from time at which the IB POINT coincides with the IB END, i.e., the input buffer becomes full, to time at which the empty area of the actual input buffer becomes equal to the resumption-start capacity. Finally, in the processing having an order of S130, S135, and S110, when the empty area of the actual input buffer becomes equal to the resumption-start capacity, the "BUSY" viewed by the host is cleared to allow data transfer.

In command take-in analysis processing in step S55 in printer soft control in FIG. 20, the IB POINT value is decremented by −1 when data is to be taken in from the input buffer area. The IB POINT value in the loop of steps S130, S131, and S130 is decreased every time data is taken in.

Figure 23:
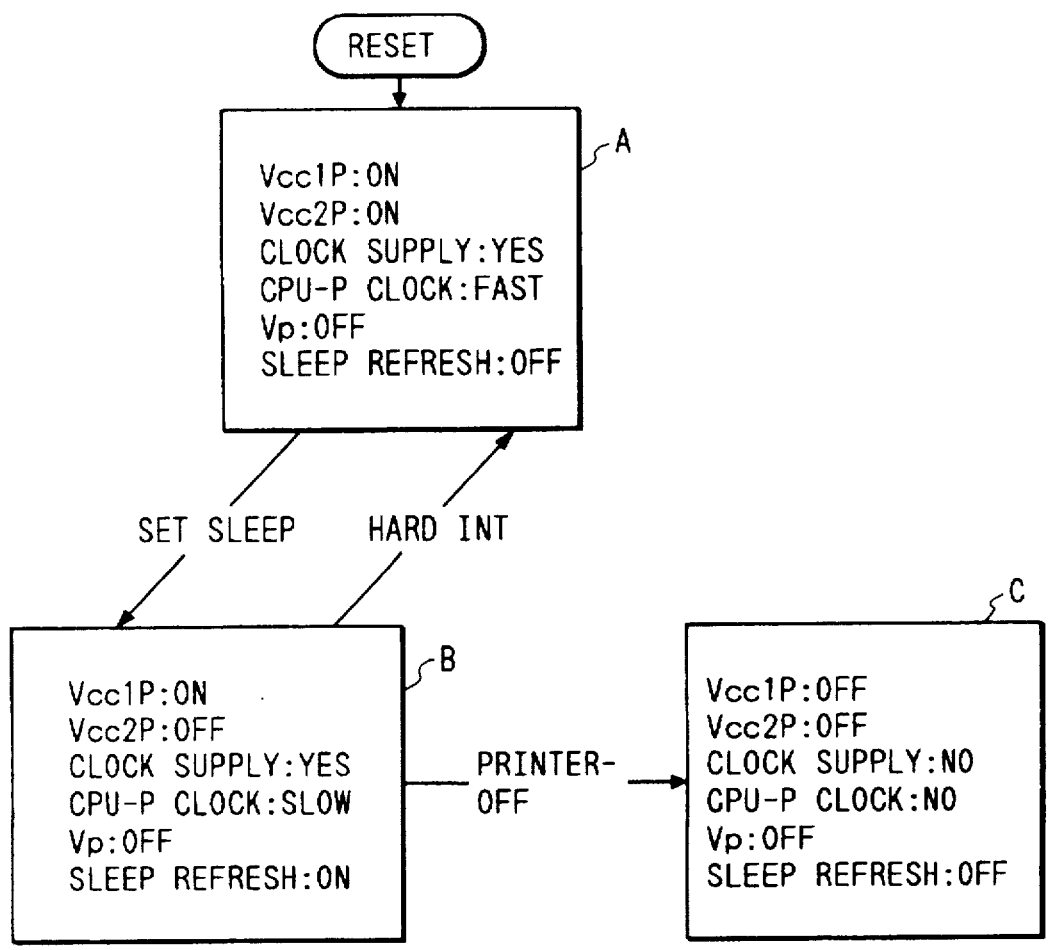
FIG. 23 is a control flow chart of power saving control of the printer CPU-P.

FIG. 23 is a detailed flow chart of power saving control processing in FIG. 20.

Interrupt mask (INT MASK) processing is performed in step S80, and the flow advances to step S81. It is checked in step S81 if printer drive control is ON. If YES in step S81, the interrupt mask is cleared in step S103, and the flow returns to the main flow. However, if NO in step S81, the flow advances to step S82 to check if one line of dot data is developed. If one-line dot data development is completed, the flow advances to step S83 to check if the printer is currently set in an Active Mode. If YES in step S83, the flow advances to step S103. However, if NO in step S83, the flow advances to step S84 to turn on a printer drive power source Vp, and the flow advances to step S103. However, if NO in step S82, i.e., when one-line dot data development has not yet been completed, the flow advances to step S85. In step S85, the power source Vp is turned off, and the flow advances to step S86 to check if the dot data is developed. If YES in step S86, the flow advances to step S88. Otherwise, the flow advances to step S87 to check if a Printer-off signal is detected. If YES in step S87, the flow advances to step S71 in FIG. 21, and END processing in steps S71 and S72 is performed. However, if NO in step S87, the flow advances to step S103. It is checked in step S88 if data is present in the input buffer. If NO in step S88, the flow advances to step S87. However, if YES in step S88, the TIMER-P Set Mode is cleared in step S90. The subsequent steps S91, S92, and S93 are procedures performed expecting the next external hardware interrupt. After the Sleep Mode is set, the hard interrupt is cleared, and a Halt Mode is set. When a hard interrupt is detected in the state of step S93, operations correspond to steps S100, S101, and S102, so that the Halt Mode is cleared. The Sleep Mode is cleared, and Ready Mode resumption processing such as writing of a command corresponding to the hard interrupt is performed. The flow then advances to step S103.

Figure 24:
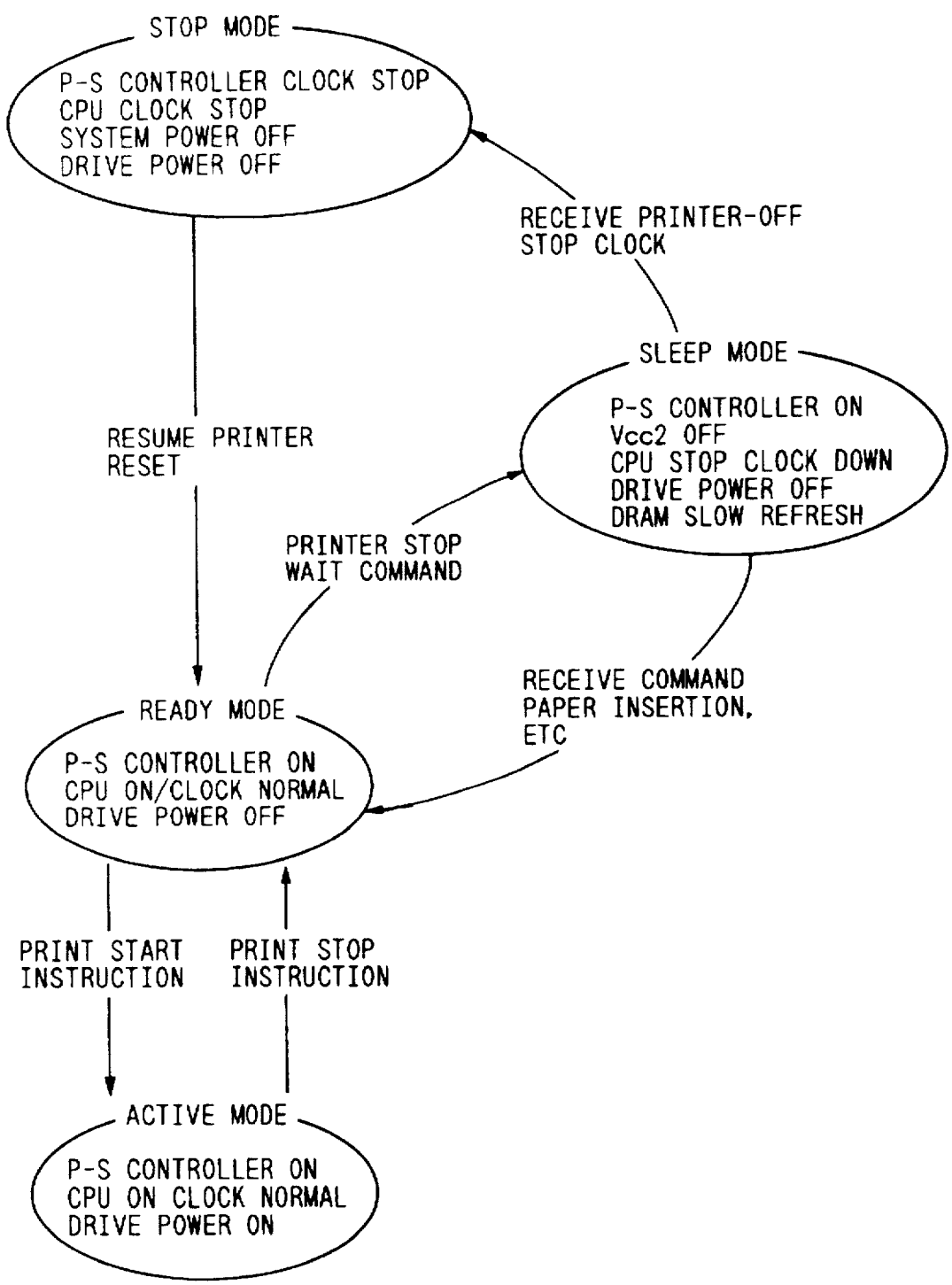
FIG. 24 is a flow chart showing changes in a printer PM controller.

FIG. 24 is a chart showing transition of states of the printer PM controller in accordance with conditions.

After the RESET is performed, the printer PM controller is set in a state A. When the Sleep Mode is set in the PMM/IO register, the printer PM controller is changed to a state B. The only change in state A is a change from state A to state B by sleep setting of the CPU-P. Changes in state B are two changes, i.e., a change to state A upon occurrence of paper insertion, an operation SW input, a data input, or the like, and a change to state C by the Printer-off signal from the host.

Figure 25:
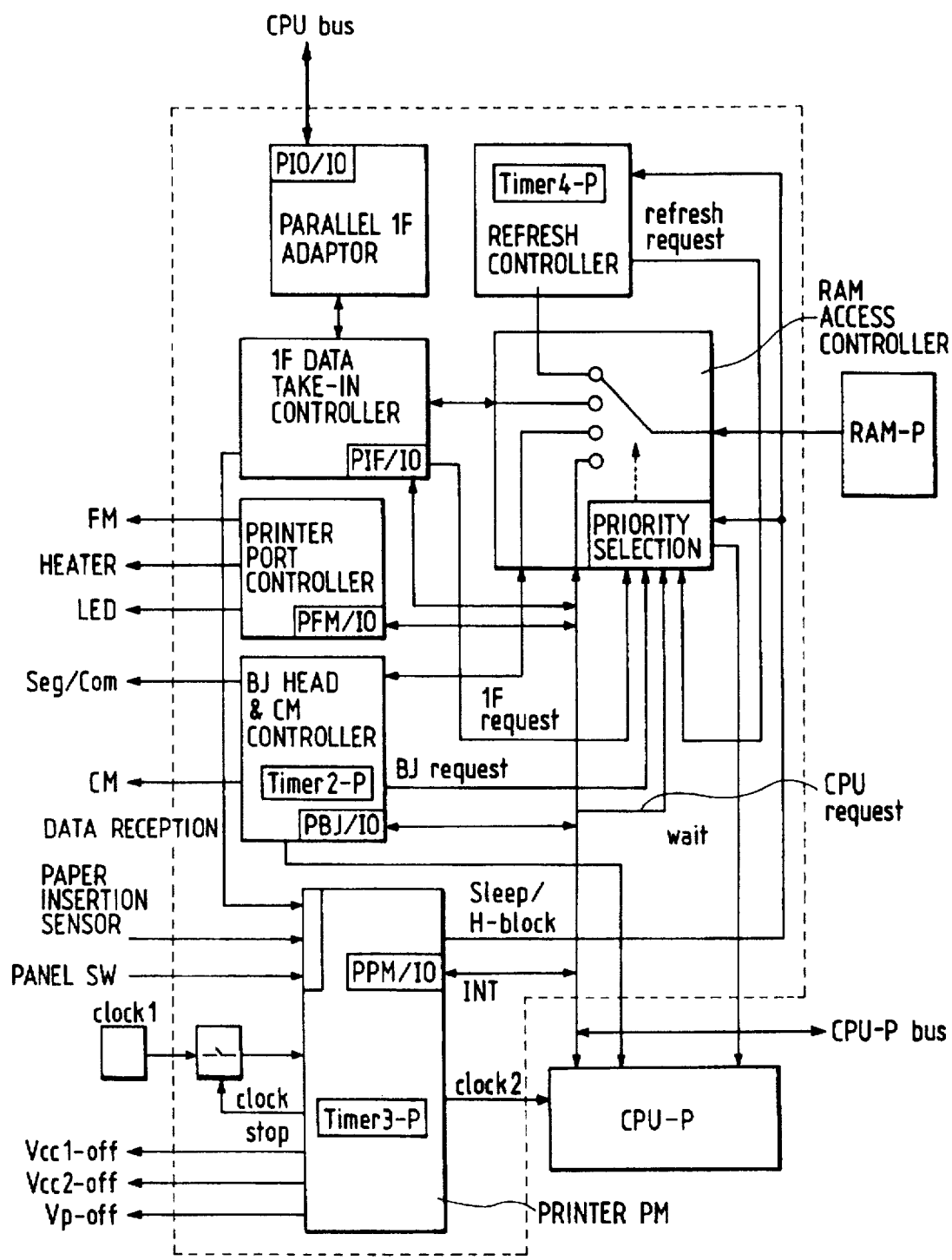
FIG. 25 is a flow chart showing changes in states as a printer system.

FIG. 25 is a chart showing transition in the overall printer system.

There are four states, i.e., a Stop Mode in which all clocks are absent and no power supply is made, an Active Mode in which all the power sources and clocks are normal and a print ready state is set, a Ready Mode without any printer drive power supply as compared with the Active Mode, and a Sleep Mode in which Vcc power supply is made to only the CPU-P, the controllers, and the RAM-P, the CPU-P and the RAM-P are basically inoperative, and the contents of the memories and registers are at least held.

Change systems of the respective modes, CPU-P control, and the change systems of the controllers will be correspondingly described below.

In the RESET state, the Ready Mode is set. This can be realized by using a change system of RESET→A in FIG. 24.

In the Ready Mode, the first change system from the Ready Mode is a system of Ready Mode→Active Mode, which is controlled by the CPU-P in step S84 in FIG. 23. The second change system from the Ready Mode is a system of Ready Mode→Sleep Mode, in which when data to be processed is absent in an end-of-print state in a series of CPU-P operations in steps S81 to S93 in FIG. 23, the "Sleep" is set in the controller to obtain a Halt state, and the change from state A to state B (FIG. 24) occurs in the controller by Sleep setting.

In the Active Mode, only one change system from the Active Mode, i.e., a system of Active Mode→Ready Mode, which is controlled by the CPU-P in step S85 in FIG. 24, is available.

In the Sleep Mode, the first change system from the Sleep Mode is a system of Sleep Mode→Ready Mode, in which a change in state from state B in state A in FIG. 24 occurs by paper insertion, an operation SW input, a data input or the like. At the same time, a hardware interrupt is input to the CPU-P, and the CPU-P restores the initial state by steps S100 to S103 in FIG. 23. The second change system from the Sleep Mode is a system of Sleep Mode→Stop Mode in accordance with a condition using the Printer-off signal. This second change system causes a change in state from state B to state C in FIG. 24 in the controller and does not require CPU-P control.

A relationship between occurrence of a BUSY state and high-speed transfer will be described below.

Figure 22:
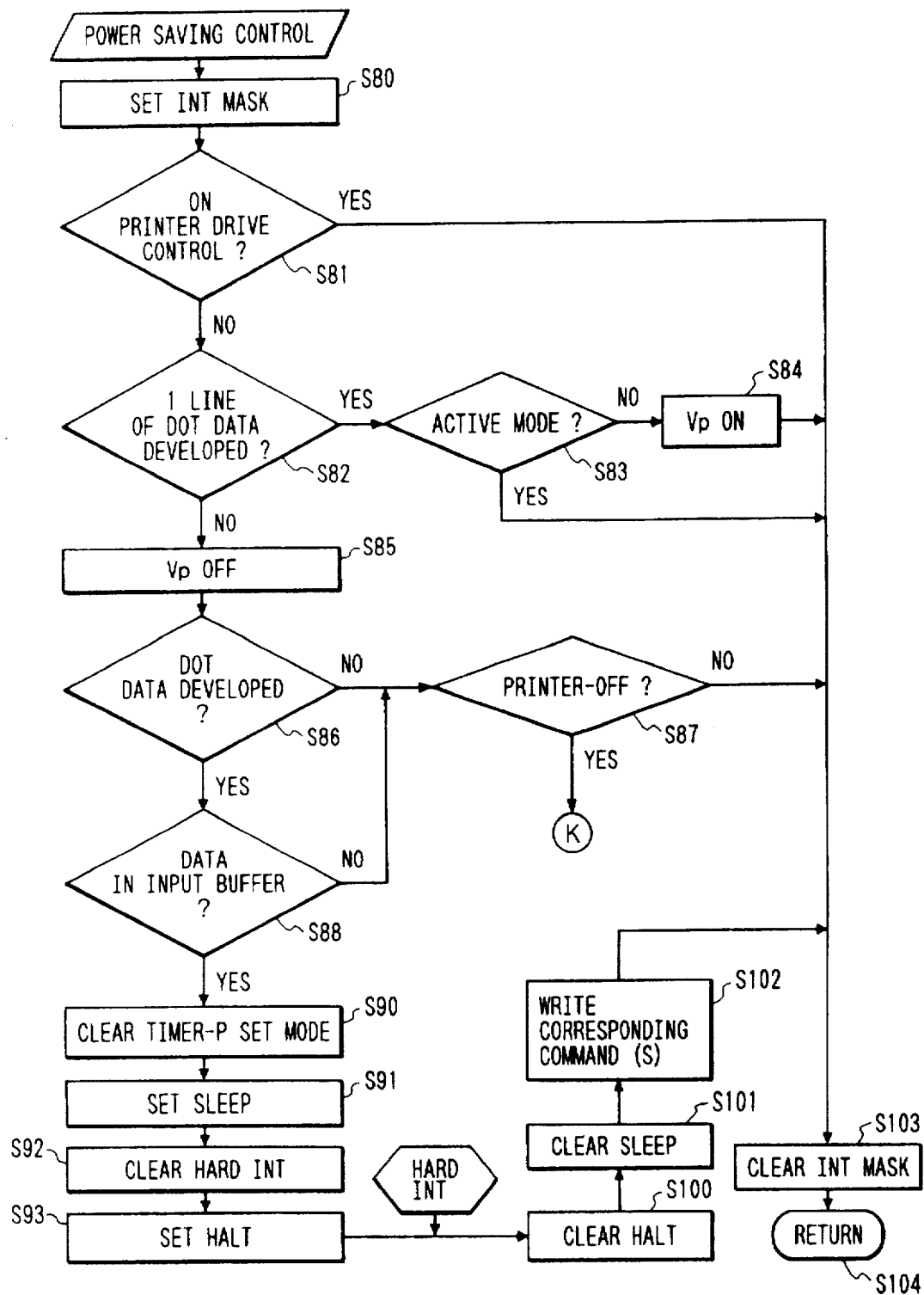
FIG. 22 is a control flow chart of processing in an IF take-in controller.

The parallel IF of a general personal computer performs data transfer handshaking using the BUSY and ACK signals. However, in practice, the BIOS performs data transfer with the I/O register of the host parallel IF adapter. However, according to the present invention, the BUSY control state described with reference to FIG. 22 is employed. That is, the BUSY signal by handshaking which greatly decreases the transfer rate is not generated until the input buffer becomes full. When the input buffer becomes full, the BUSY signal by handshaking is generated. When processing having an order of application→printer driver→OS→BIOS→parallel IF adapter is to be performed as the printer processing of the host, BIOS control suitable for the parallel IF can be realized in the form depending on the BIOS processing speed. When processing in an order of application→printer driver →I/O register of parallel IF adapter, or in an order of application→MS→WINDOWS→printer driver→I/O register of parallel IF adapter is to be performed as printer processing of the host, an exclusive printer driver is used to eliminate the BIOS overhead, thereby enjoying the maximum transfer rate of the printer.

The present invention exemplifies the embodiment describing an ink-jet recording scheme, but is not limited as to the types of printers and the types of recording schemes, as a matter of course.

In addition, the present invention exemplifies an integral arrangement including a personal computer and a printer. However, the present invention is also applicable to a personal computer and a printer separated from the personal computer but having the same battery drive source as that of the personal computer.

In addition, when a printer has a separate battery drive source, a system of Ready Mode→Stop Mode by the Printer-off signal need not be used, and the resultant apparatus can be realized in the form excluding this system.

In addition, the present invention has been described mainly with reference to the personal computer as the host. However, if an arrangement in which a printer unit can be independently controlled is employed, the present invention is not limited to a specific apparatus if an apparatus (e.g., a Japanese wordprocessor and a system notebook) has a communicating means to an external device or can perform communication through a bus.

As has been apparent from the above description, between the host and printer IFs, and particular, in the I/O register in the host parallel IF, the BUSY signal by handshaking which greatly decreases the transfer rate is not generated until the input buffer becomes full. The BUSY signal is generated when the input buffer becomes full. High-speed operations can be achieved in transfer of the standard BIOS and in transfer using a printer driver for directly accessing the I/O register of the parallel IF. Once the BUSY state is cleared, a predetermined amount of data can be transferred at one time without using handshaking.

As has been described in detail, according to the present invention, there is provided a data transfer method in which when data transfer is performed through a parallel interface between data processing and printer units connected to the I/O register through a bus, and a transfer data storage area in the printer unit has an empty area having a predetermined amount or more, virtual busy data for handshaking is transferred to the I/O register.

As has been described in detail, according to the present invention, there is provided a data transfer method in which when data is transferred by handshaking using general BIOS control through a parallel IF between data processing and printer units connected to an I/O register through a bus, and a transfer data storage area in the printer unit has an empty area having a predetermined amount or more, handshake busy data is not transferred to the I/O register.

What is claimed is:

1. A printing apparatus comprising:
   a data processing unit comprising:
   first register means, connected to an interface, for transferring a print command and data to the interface, and
   first processing means for controlling a transfer timing of the print command and data from said first register means to the interface; and
   a printing unit comprising:
   second register means, connected to the interface, for receiving the print command and data transferred from said data processing unit,
   memory means for storing the print command and data received by said second register means,
   a printer mechanism for printing data, and
   second processing means for modifying the data stored in said memory means into printable data and controlling said printer mechanism to print the printable data,
   wherein said data processing unit determines whether a busy signal from said first register means is detected and transfers data to said printing unit when the busy signal is not detected, and
   wherein said printing unit further comprises:
   determining means for determining whether or not said memory means has a vacant memory area larger than a predetermined value each time a predetermined amount of data is transferred from said data processing unit; and
   busy signal generating means for causing said second register means to provide, to said first register means, a virtual busy signal which is not detectable by said data processing unit as a busy signal in response to said determining means determining that said memory means has a vacant memory area larger than the predetermined value or a busy signal which is detectable by said data processing unit in response to said determining means determining that said memory means does not have a vacant memory area larger than the predetermined value.

2. An apparatus according to claim 1, wherein said printer mechanism comprises an ink jet printer.

3. An apparatus according to claim 1, wherein said data processing unit comprises a computer.

4. An apparatus according to claim 1, wherein said printing unit further comprises additional determining means for, after the busy signal has been generated, determining whether the vacant memory area of said memory means has increased to reach the predetermined value and means for stopping the busy signal generated by said busy signal generating means when said additional determining means determines that the vacant memory area of said memory means has reached the predetermined value.

5. An apparatus according to claim 1, wherein said information processing unit further comprises a keyboard.

6. An apparatus according to claim 1, wherein said information processing unit further comprises a display.

7. A method of operating a printing apparatus that comprises:

a data processing unit comprising:
first register means, connected to an interface, for transferring a print command and data to the interface, and
first processing means for controlling a transfer timing of the print command and data from the first register means to the interface; and a printing unit comprising:
second register means, connected to the interface, for receiving the print command and data transferred from the data Processing unit,
memory means for storing the print command and data received by the second register means,
a printer mechanism for printing data, and
second processing means for modifying the data stored in the memory means into printable data and controlling the printer mechanism to print the printable data,
said method comprising:

at the data processing unit, a first step of determining whether a busy signal from the first register means is detected and a step of transferring data to the printing unit when the busy signal is not detected, and at the printing unit, a second step of determining whether or not the memory means has a vacant memory area larger than a predetermined value each time a predetermined amount of data is transferred from the data processing unit, and a step of causing the second register means to generate either a virtual busy signal which is not detectable by the data processing unit as a busy signal in response to said second determining step determining that the memory means has a vacant memory area larger than the predetermined value or a busy signal which is detectable by the data processing unit in response to said second determining step determining that the memory means does not have a vacant memory area larger than the predetermined value.

8. A method according to claim 7, wherein said method further comprises the step at the printing unit of performing data printing based on the data stored in the memory means.

9. A method according to claim 7, wherein the printer mechanism comprises an ink jet printer.

10. A method according to claim 7, wherein the data processing unit comprises a computer.

11. A method according to claim 7, wherein said method further comprises at the printing unit the additional determining step of, after the busy signal has been generated, determining whether the vacant memory area of the memory means has increased to reach the predetermined value and the step of stopping the busy signal generated when the additional determining step determines that the vacant memory area of the memory means has reached the predetermined value.

12. A method according to claim 7, wherein the information processing unit further comprises a keyboard.

13. A method according to claim 7, wherein the information processing unit further comprises a display.

* * * * *

UNITED STATES PATENT AND TRADEMARK OFFICE
CERTIFICATE OF CORRECTION

PATENT NO.     : 5,787,308                                              Page 1 of 1
DATED          : July 28, 1998
INVENTOR(S)    : Naohisa Suzuki et al.

It is certified that error appears in the above-identified patent and that said Letters Patent is hereby corrected as shown below:

<u>Title page,</u>
Item [73], Assignee, "Canon Kabushiki Kaisa" should read -- Canon Kabushiki Kaisha --.

<u>Column 2,</u>
Line 45, "system." should read -- system; and --.

<u>Column 13,</u>
Line 19, "information" should read -- data --.
Line 21, "information" should read -- data --.
Line 34, "Processing" should read -- processing --.

<u>Column 14,</u>
Line 36, "informa-" should read -- data --.
Line 37, "tion" should be deleted.
Line 38, "informa-" should read -- data --.
Line 39, "tion" should be deleted.

Signed and Sealed this

Twelfth Day of November, 2002

Attest:

JAMES E. ROGAN
Attesting Officer     Director of the United States Patent and Trademark Office